(12) United States Patent
Shah

(10) Patent No.: US 11,386,740 B2
(45) Date of Patent: Jul. 12, 2022

(54) VENDING SYSTEM AND METHOD FOR CONTACTLESS VENDING TRANSACTIONS

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 16/901,573

(22) Filed: Jun. 15, 2020

(65) Prior Publication Data

US 2021/0327203 A1  Oct. 21, 2021

Related U.S. Application Data

(63) Continuation-in-part of application No. 16/853,845, filed on Apr. 21, 2020.

(51) Int. Cl.
| | |
|---|---|
| *G07F 17/00* | (2006.01) |
| *G07F 11/06* | (2006.01) |
| *G06Q 20/40* | (2012.01) |
| *G06F 21/32* | (2013.01) |

(52) U.S. Cl.
CPC .......... *G07F 17/0092* (2013.01); *G06F 21/32* (2013.01); *G06Q 20/40145* (2013.01); *G07F 11/06* (2013.01)

(58) Field of Classification Search
CPC ...... G07F 17/0092; G07F 11/06; G06F 21/32; G06Q 20/40145
See application file for complete search history.

(56) References Cited

U.S. PATENT DOCUMENTS

| | | | | |
|---|---|---|---|---|
| 10,317,119 B2 * | 6/2019 | Zou | ...................... | G06Q 10/087 |
| 10,546,445 B2 * | 1/2020 | Lopez | .................... | A21C 15/04 |
| 10,762,739 B2 * | 9/2020 | Yu | ....................... | G07F 17/0078 |
| 10,863,867 B2 * | 12/2020 | Lopez | ..................... | A47J 47/01 |
| 2010/0010666 A1 * | 1/2010 | Adams | .................... | G07F 9/026 700/231 |
| 2011/0059209 A1 * | 3/2011 | Khatchadourian | .. | A21C 11/006 426/232 |
| 2012/0185086 A1 * | 7/2012 | Khatchadourian | ..... | G07F 11/70 99/345 |
| 2014/0316875 A1 * | 10/2014 | Tkachenko | ........ | G06Q 30/0202 705/14.25 |
| 2016/0155127 A1 * | 6/2016 | Hartman | ................ | G06Q 20/18 705/18 |

(Continued)

*Primary Examiner* — Michael Collins
(74) *Attorney, Agent, or Firm* — The Law Offices of Konrad Sherinian, LLC

(57) ABSTRACT

A vending system is disclosed and claimed. In particular, the disclosed vending machine system allows multiple vendors to sell food items through a vending machine. The vending machine provides multiple locked bins, each of which can authenticate to a single vendor. Also, the vending machine implements price adjustment rules, such as raising the price of a particular item during, before, and after a high traffic event. In addition, customer dietary restrictions can be tracked, and purchases of food items that would violate those dietary restrictions can be prevented. The vending system allows a consumer to perform contactless vending transactions, with the identity of the consumer being verified through biometrics and a camera. Upon verification of the consumer, the vending system transacts payment for selected items, dispenses items in a contactless manner, updates inventory of items, records the purchase history of consumer, and provides indisputable visual media evidence of the transaction.

5 Claims, 15 Drawing Sheets

(56) References Cited

U.S. PATENT DOCUMENTS

| | | | |
|---|---|---|---|
| 2016/0376102 A1* | 12/2016 | Cook, II | G07F 17/0078 |
| | | | 414/281 |
| 2019/0051088 A1* | 2/2019 | Treadwell | G07F 11/46 |
| 2020/0034807 A1* | 1/2020 | Shamai | G06Q 20/325 |
| 2020/0273042 A1* | 8/2020 | Wang | G06Q 20/18 |
| 2021/0326948 A1* | 10/2021 | Shah | G06Q 20/18 |

* cited by examiner

VENDING SYSTEM AND METHOD FOR CONTACTLESS VENDING TRANSACTIONS

CROSS-REFERENCE

This application is a continuation-in-part application of U.S. application Ser. No. 16/853,845, filed Apr. 21, 2020 and entitled NETWORKED FOOD PREPARATION AND VENDING MACHINE, which this application claims benefit of, and which is incorporated herein for all purposes in its entirety.

FIELD OF THE DISCLOSURE

The present disclosure relates to vending machines and contactless, networked vending transactions. More particularly, embodiments of the present disclosure relate to a networked food preparation and vending transaction that can adjust prices based on an external calendar of events; and further, allows a consumer to perform contactless vending transactions with a vending system, with the identity of the consumer being compared with stored consumer personal data, and verified through biometrics and visual media by the vending system; whereby, upon verification the vending system transacts payment for the selected items, dispenses the items in a contactless manner, updates inventory of items, records the purchase history of the consumer, and provides indisputable visual media evidence of the transaction.

BACKGROUND

Vending machines are well known. Typically, a vending machine will include storage and dispensation of items, such as snacks (bars of various kinds, chips of various kinds, candies), beverages, such as soft drinks (typically refrigerated), and other food items. Briefly, prior art vending machines are periodically loaded with items such as those listed above and then dispensed in response to orders placed by a user, typically using a selection panel on the machine.

More complicated vending machines are known as well. Vending machines that are capable of preparing certain foods are well known. For example, BiCom, an Italian company, is presently marketing a vending machine that it claims is capable of preparing and vending certain Italian dishes. Also, networked vending machines have been discussed in the art since at least 1998, and, starting around 2010, several IoT ("Internet-of-Things") enabled vending machines have been marketed, sold, and deployed throughout the world. Such networked vending machines typically provide for advanced inventory management features, as well as credit card acceptance, and even accepting payment through means such as Apple Pay and Google Wallet. Most recently, advanced vending machines even allow orders to be placed via mobile devices (such as cellphones and tablets).

Vending machines are typically located in high traffic areas where people will have limited access to restaurants, such as factories, office buildings, airports, and workout centers. Often, vending machine operators find that their machines are frequented by the same people day-after-day, which allows them to build habitual behavior and brand loyalty. Such vending machines often make for superb automated sales and marketing platforms.

While vending machines have certainly been successful in marketing impulse products, vending machines have not been able to make the jump to automated food preparation platforms. In particular, despite the proliferation of IoT capable vending machines, inventory management issues persist. Inventory management issues can include stocking too much of a particular item, or too little of another, and translate into predictable consequences; i.e., items expiring before being sold, or not having any of a popular item when an important event occurs, such as a school football game, or a large meeting at a company. In addition, poor inventory management in vending machines has made it impractical for vending machines to serve fresh food, such as vegetables, which typically has a short expiration date, despite refrigeration technologies being available in vending machines for many years.

In addition, prior art vending machines do not have significant food preparation capabilities. Rather, even modern vending machines that advertise food preparation capabilities have simple food preparation capabilities such as turnstile heaters. These capabilities are limited—there is no capability for a customer to order a burger or fresh French Fries (for example). Similarly, there is no provision for consumer choice, such as ordering a dish "spicy" or with certain options, such as a burger with lettuce, tomato, and onions.

Accordingly, a need exists for an improved vending machine that incorporates more extensive food preparation capabilities and inventory management capabilities than what has been seen in the prior art. In particular, there is a need for a networked vending machine with extensive inventory management capabilities, including price adjustment capabilities, as well as extensive food preparation capabilities and order taking capabilities.

OBJECTS OF THE DISCLOSURE

It is an object of the disclosure to provide a vending machine system that allows for efficient and profitable vending of healthy foods.

It is another object of the disclosure to provide a vending machine system that can provide a report to monitors of the eating habits of a monitored user.

It is another object of the disclosure to provide a vending machine system that allows for multiple vendors to load food items into a vending machine.

It is another object of the disclosure to provide a vending machine system that authenticates multiple vendors to load food items into a vending machine on a per bin basis.

It is another object of the disclosure to provide a vending machine system that allows for the vending of prepared foods.

It is another object of the disclosure to provide a vending machine system that allows for the vending of food items with optional ingredients.

It is another object of the disclosure to provide a vending machine system that allows users to place mobile orders.

It is another object of the disclosure to provide a vending machine system that allows users to place mobile orders and pick up their food items at a particular vending machine at a later time.

It is another object of the disclosure to provide a vending machine system that allows users to place mobile orders and reserve food items at a particular vending machine at a later time.

It is another object of the disclosure to provide a vending machine system that allows for rule-based adjustment of prices for food items.

It is another object of the disclosure to provide a vending machine system that allows for the increase of prices based on a schedule of high traffic events.

It is another object of the disclosure to provide a vending machine system that tracks customers' dietary restrictions.

It is another object of the disclosure to provide a vending machine system that prevents customers from ordering any food items that would violate their dietary restrictions.

It is another objective of the disclosure to enable a consumer to perform contactless vending transactions with a vending system.

It is another objective of the disclosure to provide a vending system that transacts payment for the selected items, dispenses the items in a contactless manner, updates inventory of items, records the purchase history of the consumer, and provides indisputable visual media evidence of the transaction.

It is another objective of the disclosure to allow a consumer to select items for purchase, and collect the items from the dispenser of a vending system in a contactless manner.

It is another objective of the disclosure to dispense a potentially free or paid medical item. For example, a free mask is dispensed every day in a contactless system for inner city residents, or PPE for use every day by workers at a nursing home.

It is another objective of the disclosure to validate receipt of a particular item through a video recording, so as to eliminate fraud, such as when the consumer claims the item was not received from the vending machine.

It is another objective of the disclosure to reduce fraud and improve the accuracy of a vending order.

It is another objective of the disclosure to minimize the odds of the transmission of bacteria, virus, and germs during vending transactions.

It is another objective of the disclosure to enhance inventory data collection through use of an item scanner in the vending system.

It is another objective of the disclosure to maintain a log of consumer purchase history, so as to develop marketing and customer loyalty programs.

It is another objective of the disclosure to allow an item provider, such as a company, to selectively dispense items to employees or limited number of consumers.

It is another objective of the disclosure to provide a vending system that is operable to produce vending transactions through a personal mobile communication device.

It is another objective of the disclosure to provide an inexpensive of manufacture vending machine.

It is another objective of the disclosure to provide a system and method for contactless authentication of consumers in a vending transaction.

Other advantages of this disclosure will be clear to a person of ordinary skill in the art. It should be understood, however, that a system, an apparatus or a method could practice the disclosure while not achieving all of the enumerated advantages, and that the claims define the protected disclosure.

SUMMARY OF THE DISCLOSURE

The present disclosure provides a vending machine system that provides several advantages over prior art vending machine systems. To start, the disclosed vending machine system is adapted to allow multiple vendors to load food items into a single vending machine. Accordingly, multiple vendors can effectively use the vending machine as a shop to sell their pre-packaged or individually prepared foods. In particular, in an embodiment of the disclosed vending machine system, a vending machine can include multiple storage bins, each with a separate lock. Each lock can be configured to allow a single vendor access, i.e., to authenticate the access of a single vendor.

In a further embodiment of the disclosed vending machine system, the vending machine includes a food preparation module that allows for the preparation and vending of prepared foods. In particular, the food preparation module allows for the heating of foods.

If a further embodiment of the disclosed vending machine, the vending machine includes a network interface that allows the vending machine to receive orders from remote users, i.e., from mobile device users and web users.

In a further embodiment of the disclosed vending machine, the vending machine includes several price adjustment rules. The price adjustment rules can include lowering the price as an expiration date approaches, or raising the price before, during, and after a high traffic event.

In another possible embodiment of the present disclosure, a vending system and method for contactless vending transactions allows a consumer to perform contactless vending transactions with a vending system. The identity of the consumer is compared with pre-registered and stored consumer data, which is verified through biometric readings and/or a video recording of the consumer. Then, upon verification of the consumer identity and linkage to the consumer data, the vending system: transacts payment for the selected items, dispenses the items to the consumer in a contactless manner, updates inventory of items, records the purchase history of the consumer, and provides indisputable video evidence of the transaction.

In some embodiments of the vending system, the consumer initially populates a remote data storage unit with consumer data, i.e., personal information, during a registration stage, prior to the vending transaction. The consumer data may include, without limitation, monetary account data of the consumer, biometric data of the consumer, an image of the consumer, a name, contact information, and a password. The consumer data is stored, and subsequently processed, by processing and memory components of the vending system to identify the consumer. Further, the consumer may utilize a mobile communication device that is in communication with the remote data storage unit to access and modify the personal information, and also to transact vending purchases.

The vending system may include, without limitation, a conventional vending machine, an ATM, an automated kiosk, and an automated machine for vending or providing goods or services to a consumer in exchange for payment. The vending system is configured to identify the consumer through biometric readings and captured images of the consumer, while in proximity to the vending system. Upon verification of the consumer, the vending system transacts payment for the selected items, dispenses the items to the consumer in a contactless manner, updates inventory of items, records the purchase history of the consumer, and provides indisputable video evidence of the transaction.

The vending system is in communication with the remote data storage unit that stores the consumer data. The vending system accesses the consumer data to verify the consumer and perform the vending transaction.

In one embodiment, the vending system comprises a housing, multiple storage bins, a processor, a data storage device, a vending machine controller, a biometric reader, a camera, a transmitter, a receiver, a dispenser, and an item scanner.

The storage bins retain one or more items in a visible arrangement, so that the consumer can make an appropriate selection. The biometric reader and/or the camera help identify the consumer based on the consumer data stored in the remote data storage unit. The transmitter and receivers enables communication with the remote data storage unit. The vending machine controller works with the processor to accept payment and trigger release of the items through the dispenser when one or more dispensing criteria is achieved. The vending machine controller is remotely monitored through a network. The item scanner scans an item code label that is affixed to the items as the items are dispensed. In this manner, the item scanner identifies the items and helps generate item data. The dispenser dispenses the purchased items in a contactless manner, which can include automated gates, and extendable serving plates that minimize contact between consumer and dispenser. In both the selection and collection process, the consumer and the vending system maintain a contactless relationship.

The vending system utilizes the biometric reader and/or the camera to identify the consumer, matching a physiological characteristic or an image/video of the consumer with the consumer data stored in the remote data storage unit. If there is a match, part of the dispensing criteria has been met, and the vending machine controller may dispense the selected items from the dispenser. However, additional dispensing criteria may need to be achieved prior to dispensing. These can include: having sufficient funds in a consumer monetary account, having authorization from an entity that is sourcing the items, seasonal criteria, and item limitations.

In some embodiments, the vending system records the items purchased by the consumer to develop a purchase history. The purchase history is cumulatively stored in the remote data storage unit for subsequent marketing strategies and loyalty programs that can be aimed at the consumer. Also, inventory decisions can be made based on the purchase history.

As the items dispenses through the dispenser, the item scanner identifies, i.e., digitally scans, the items to generate item data. The item scanner sends the item data to the data storage device in the vending system for storage and processing. The data storage device records the item data for the dispensed items in order to: update inventory and record the purchase history of the consumer. Further, the camera may also record the vending transaction to verify that the consumer, did indeed, receive the selected item.

In yet another possible embodiment, the consumer may utilize the mobile communication device in a pre-registration stage by populating consumer data into the remote data storage unit. The consumer data is used to verify the consumer, and to achieve dispensing criteria that must be met to dispense the items to the consumer.

In yet another embodiment, the consumer may utilize the mobile communication device to initiate a vending transaction. The mobile communication device is in communication with the vending machine controller to initiate transactions. The consumer commences the vending transaction by selecting one or more items from the vending system directly through the mobile communication device. The mobile communication device may display a menu system, a search system, or a voice ordering system to help the consumer select the desired items.

After selection of the items, the mobile communication device generates a purchase code label. The purchase code label may include a Quick Response (QR) code, that is unique for the selected items. The consumer scans the QR code at the item scanner of the vending system to intitiate the vending transaction. The vending machine controller verifies the sufficient account funds dispensing criteria is met, and the contactless dispenser dispenses the respective item.

The vending transaction through the mobile communication device allows the consumer to remain at a distance from the vending system. This maintains a contactless relationship between the consumer and the vending system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of various examples of embodiments of the disclosed system and method, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Figure 1:
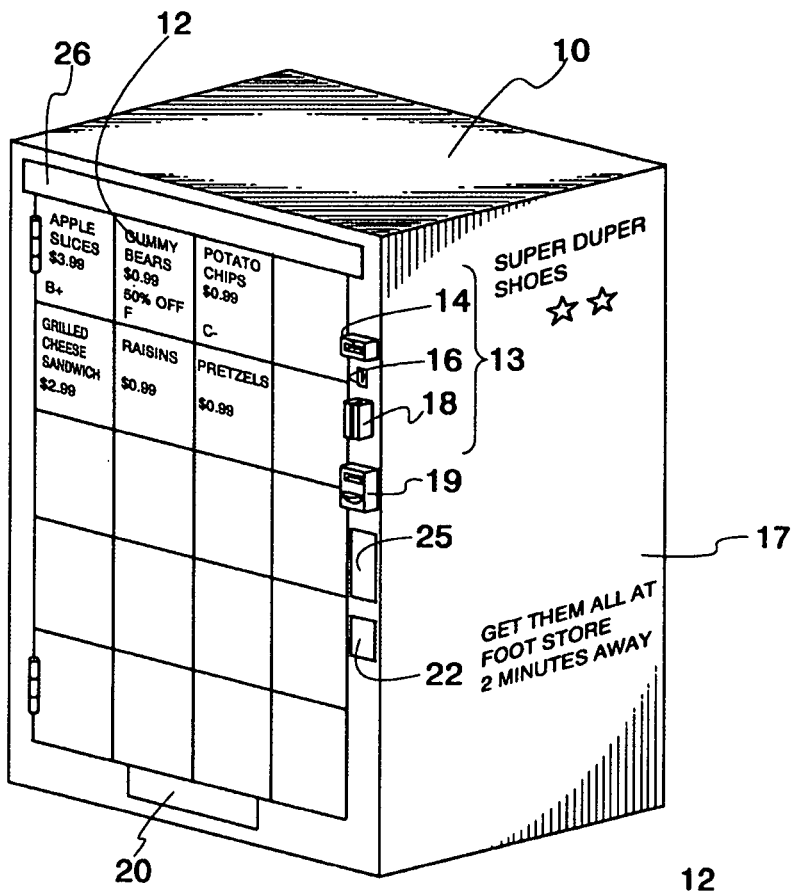
FIG. 1 is a perspective view of the front of a vending machine constructed in accordance with this disclosure.

Turning to the Figures and FIG. 1 in particular, a vending machine 10 constructed in accordance with this disclosure is shown. The vending machine 10 includes a housing 11, which in this case is depicted as rectangular cuboid housing 11 as is typical of vending machines. However, the housing 11 is not limited to a rectangular cuboid; for example, the housing 11 could be cubical, a triangular right prism, cylindrical, or other types of shapes. The vending machine 10 also includes a front panel 12. The front panel 12 can be substantially transparent to allow the items within the vending machine 10 to be displayed. In a preferred embodiment of the disclosed vending machine 10, the front panel 12 can consist of a touch screen coupled to housing 11 by one or more hinges so as to allow the front panel to be opened (as discussed below). The front panel 12 can allow a user (not shown) to make selections by manipulating the front panel 12 using touch controls.

The vending machine 10 also includes a payment processor 13. The payment processor can include, for example, a bill reader 14, a coin slot 16, an electronic payment processor 18, and a money return 19. The bill reader 14 is adapted to recognize, validate, and accept paper currency (bills) as payment. The coin slot 16 performs a similar function to the bill reader 14, but with coin currency. The electronic payment processor 18 can perform several functions. First, the electronic payment processor 18 can read and charge credit cards, debit cards, and certain gift cards. Second, the electronic payment processor can interface with mobile devices to charge e-wallets, such as Apple Pay®, and Google Wallet®. A secondary set of controls 25, which could be a second, much smaller, touch screen, or some other configuration of controls, allows a user to make additional selections. An access mechanism 22, which can be an electronic lock or a physical lock, allows the front panel 12 to be swung open as discussed below. A vending slot 20 is disposed so as to allow items to be vended by the machine using techniques known in the art.

Figure 2:
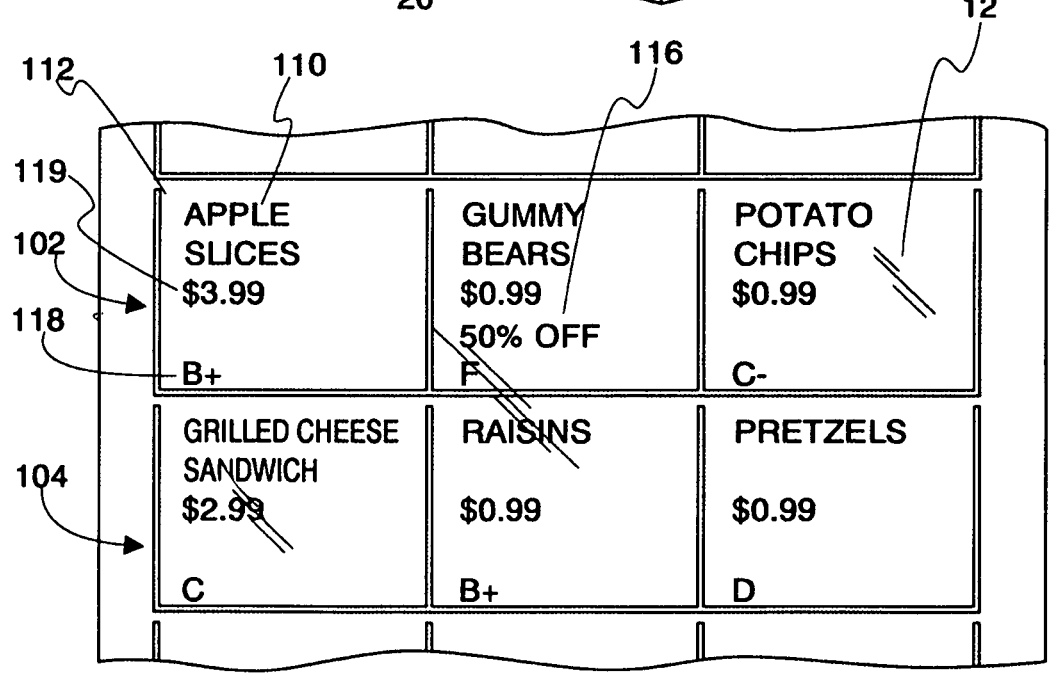
FIG. 2 is a front view of two rows of bins disposed of in a vending machine constructed in accordance with this disclosure.

Turning to FIG. 2, a view of several items on the front panel 12 is depicted. In particular, a first row of item slots 102 and a second row of item slots 104 are shown. Each of the item slots holds a particular food item. In front of each food item 110, several attributes about the food item 110 are displayed on the front panel 12. The attributes include a description 112, a price 114, a percentage off 116, and a grade 118. When an item is not discounted field 116 would not be shown. Description 112 is a simple description of the item, such as, for example, "Apple Slices". The price 114 of the item is a price displayed in the local currency, such as dollars. Finally, grade 118 is an indication of the quality of the food item; specifically, it is a grade related to how healthy (nutritious) the food is. Accordingly, very healthy food with a high nutritional content would receive a grade of A, while food that has essentially no nutritional content, had a high sugar content, or contained a known carcinogenic or toxic ingredient, would receive a grade of F. Additional information can also be shown, such as, for example, the calorie count, as well as whether a particular item is Vegan, Gluten Free, Dairy Free, and any particular allergens that the food contains, such as wheat, soy, peanuts, dairy, etc. In addition, a QR code can be displayed, with the QR code encoding in a small space additional information, such as the expiration date, which can be used by an external camera to automatically trigger discounts as part of an inventory control system or other IoT system.

In a further embodiment of the disclosed vending machine, the front panel 210 can display advertisements for various products, including products that are carried by the vending machine or other products. Similarly, display panels can be placed around the exterior of the entire vending machine; i.e., for the rectangular cuboid pictured in FIG. 2, not only the entire front panel would comprise a display, but the left, right, and rear panels would all comprise a display as well. All of the additional panels could also show advertisements.

Figure 3A:
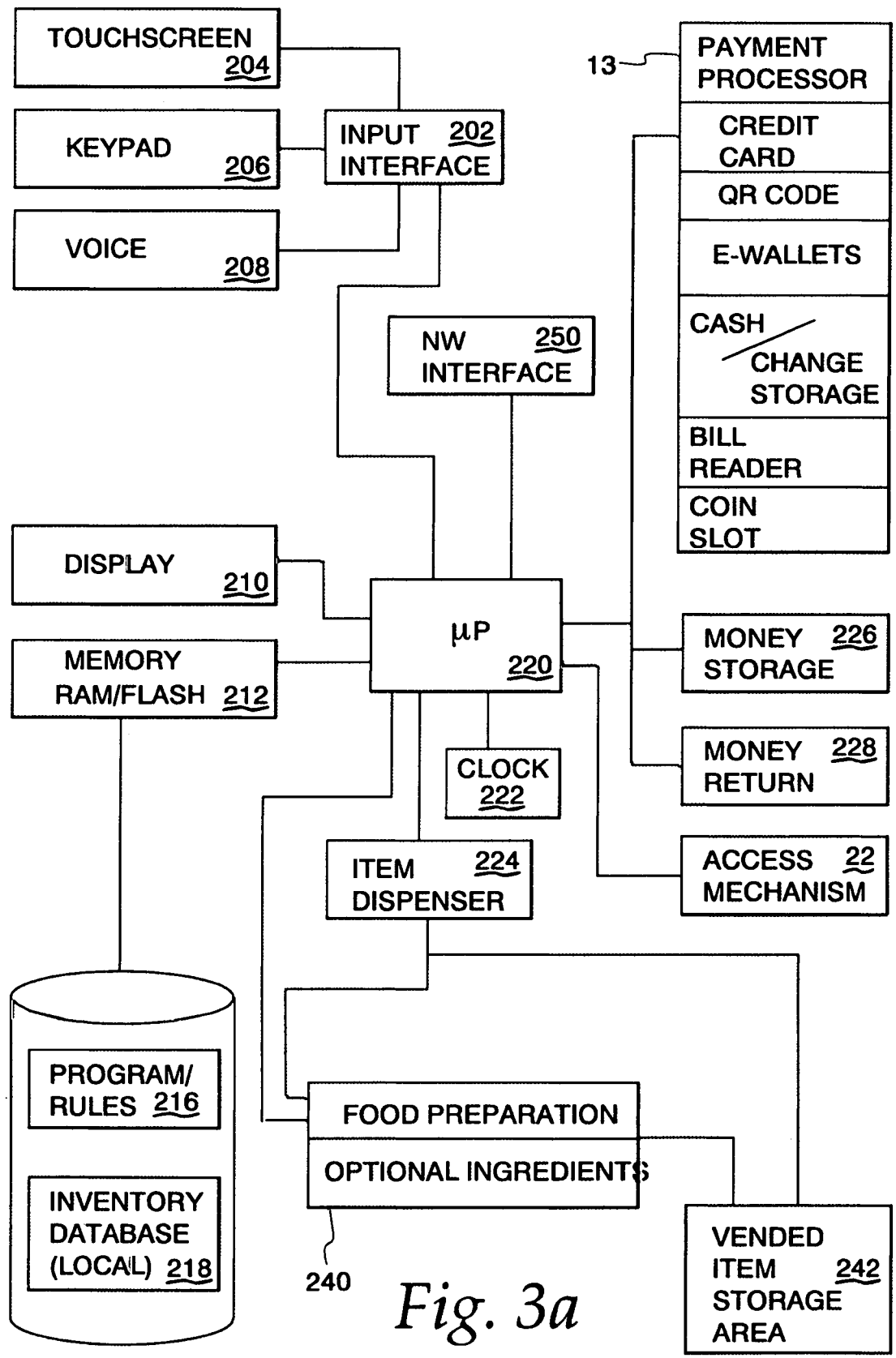
FIG. 3a is a simplified block diagram of a vending machine constructed in accordance with this disclosure.

FIG. 3a depicts a simplified block diagram of the primary components of an exemplary vending machine constructed in accordance with this disclosure. It should be noted that not all components of the vending machine are shown; for example, certain support components, packaging components, and other components are not shown.

As depicted, the vending machine 10 includes an input interface 202. The input interface 202 can include, for example, a touch screen 204, which can be integrated with or laid over a transparent front panel 12 as discussed with regards to the previous figures. Generally, a touch screen 204 The input interface 202 can also include a keypad 206 and/or a voice input 208. The keypad 206 can comprise, for example, a grouped collection of buttons, or a collection of buttons dispersed about the vending machine, such as on the front panel 12 near each of the items to be vended. The voice input 208 can comprise, for example, a microphone and speaker, and operate similarly to smart speakers, which are well known in the art. The input interface 202 can include any combination of a touchscreen 204, keypad 206, and a voice input 208, as well as additional input elements, such as a trackpad, trackball, joystick, additional buttons, etc.

In certain embodiments of the disclosed vending machine 10, the vending machine 10 can also include a display 210. This display would, for example, allow the interface discussed with FIG. 2 to be implemented, although the display could be a simpler and smaller display than the "whole front panel" display discussed previously. For example, the display 210 could be a simple LCD, either standalone or integrated with a touch screen 204, that indicates what products were purchased, whether a change was being made, etc.

The input interface 202 and display 210 (when present) are coupled to a processor 220. The processor 220 acts as the "brains" of the vending machine. It can be any microprocessor or microcontroller sufficiently powerful to accomplish the functions of the vending machine 220, including interfacing with the input interface 202, driving the display 210 (if present), and other functions. The processor 220 interfaces with memory 212, including random access memory and persistent memory, such as FLASH memory. In certain embodiments, the processor 220 can partially or completely incorporate the memory 212; i.e., certain types of processors come with integrated memory, and in other embodiments, the memory 212 can be entirely external in the form of memory chips, memory modules, etc. The memory 212 may require additional support components, such as controllers, power conditioning circuitry, etc., which is not shown here for the sake of simplicity.

The memory 212 contains a program 216, including the pricing rules discussed herein, as well as an inventory database 218. The inventory database maintains a precise count of the amount of each item contained in the vending machine.

The processor 220 can include a clock 222 or interface with an external clock 222. The processor 220 also interfaces with an item dispenser 224. The item dispenser 224 can be incorporated into each of the item slots (not shown) or comprise a movable "arm" that can be positioned to grasp a particular item and move it to the dispensing area. The item dispenser 224 can also be implemented in other ways that are known in the art.

The processor 220 is also coupled to a payment processor 13. The payment processor 13 can include, for example, a bill reader and a coin slot. In addition, as is known in the art, the payment processor 13 can also include an electronic payment processor that can charge credit cards and e-wallets, such as Google Wallet and Apple Pay. If the vending machine 10 accepts cash currency (bills and coins), then it can also include money storage 226 and a money return 2 within the 28. Finally, the payment processor can also include a QR code reader, wherein the QR code can represent a user unique wallet for currency that can be redeemed within the vending machine system. In particular, a user can use the QR code to either make purchases, or to authenticate herself, so as to pick up remote purchases at a particular vending machine.

In certain embodiments, the vending machine 10 can also include a food preparation module 240. The food preparation module 240 can include, for example, an internal toaster or microwave, as well as an internal motion device, such as a rotating area, to ensure that heated food is heated uniformly. In particular, when an item is selected by a user (not shown) that requires preparation, the item dispenser 224 can move the item to the food preparation module 240 instead of vending the item directly to the user. The food can then be prepared and placed onto a vending package, such as a cardboard plate. Any optional ingredients, such as ketchup packets, wrapped tomato slices, lettuce slices, onion slices, etc., can also be added to the vending package. In addition, in such an embodiment, the vending machine 10 can include a vended item storage area 242. As explained further below, certain purchases (prepared or otherwise) can be moved to the vended item storage area 242 in certain embodiments.

In certain embodiments, the vending machine 10 can also include a network interface 250. The network interface 250 can be a wired interface, such as an Ethernet interface or a wireless interface, such as an 802.11 interface or a cellular interface. As explained below, in certain embodiments, the vending machine 10 can accept remote orders from customers using, for example, mobile devices, tablets, and web devices (such as laptop or desktop computers).

The processor 220 also interfaces with an access mechanism 22. The access point 22 can be, for example, an electronic authentication module coupled to an electronic lock. Alternatively, the access point 22 can be a simple physical lock adapted to open via a physical key. The function of the access point 22 is to allow the front panel 12 to open up as explained below.

Figure 3B:
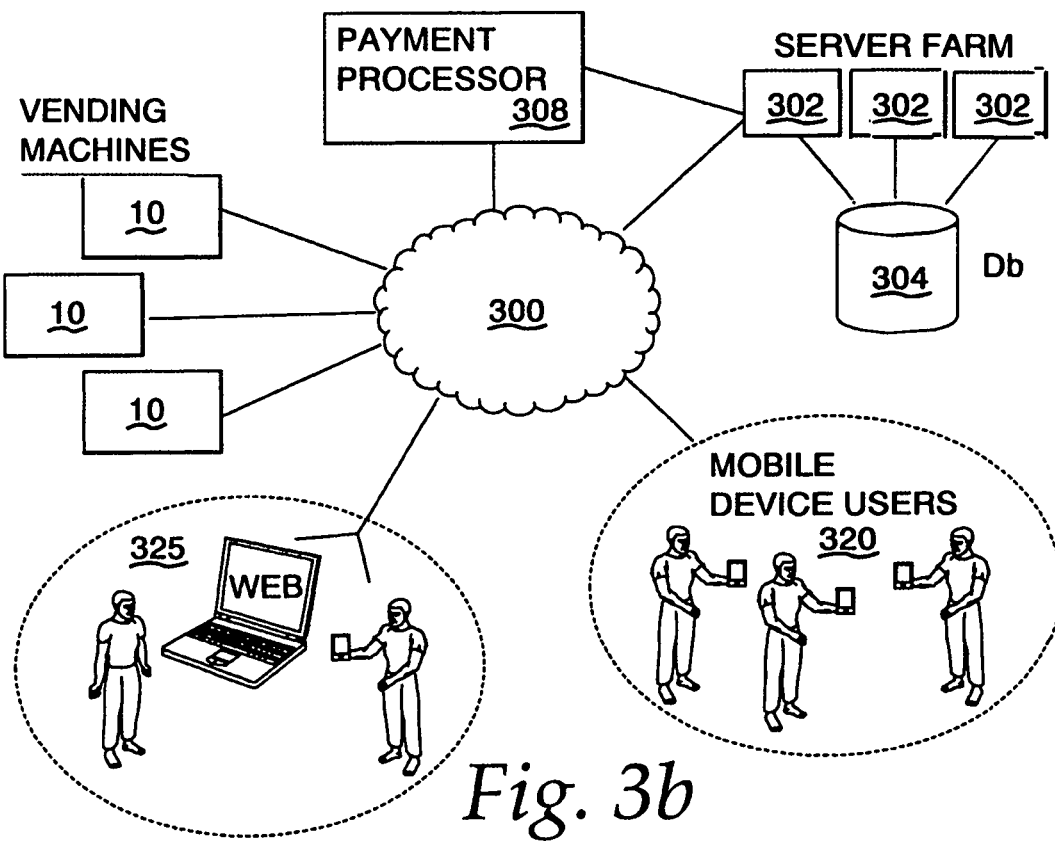
FIG. 3b is a simplified network diagram of a vending machine system constructed in accordance with this disclosure.

Turning to FIG. 3b, a network diagram depicting a system of vending machines 10, the Internet 300, a server farm 302, a networked database 304, a payment processor 308, and a collection of mobile device users 320 and web users 325. Mobile device users 320 can include smartphone users, tablet users, smartwatch users, wearable device users, and other mobile device users. Web-users 325 can include desktop users, laptop users, and mobile web users.

In particular, mobile device users 320 and web users 325 can place orders via the Internet 300. The orders are received by the server farm 302 and routed to a target vending machine 10, i.e., a vending machine located at a specific location. Before routing the order, the server farm 302 consults the database 304 to ensure that a specific requested item can be vended by the requested machine 10. If so, the server farm directs the user's device to make payment at the payment processor 308, which will confirm payment to the server farm 302. Once payment is confirmed, the server farm 302 updates the database to ensure that the inventory at the target vending machine 10 is updated, and then places the order with the target vending machine 10.

Figure 4:
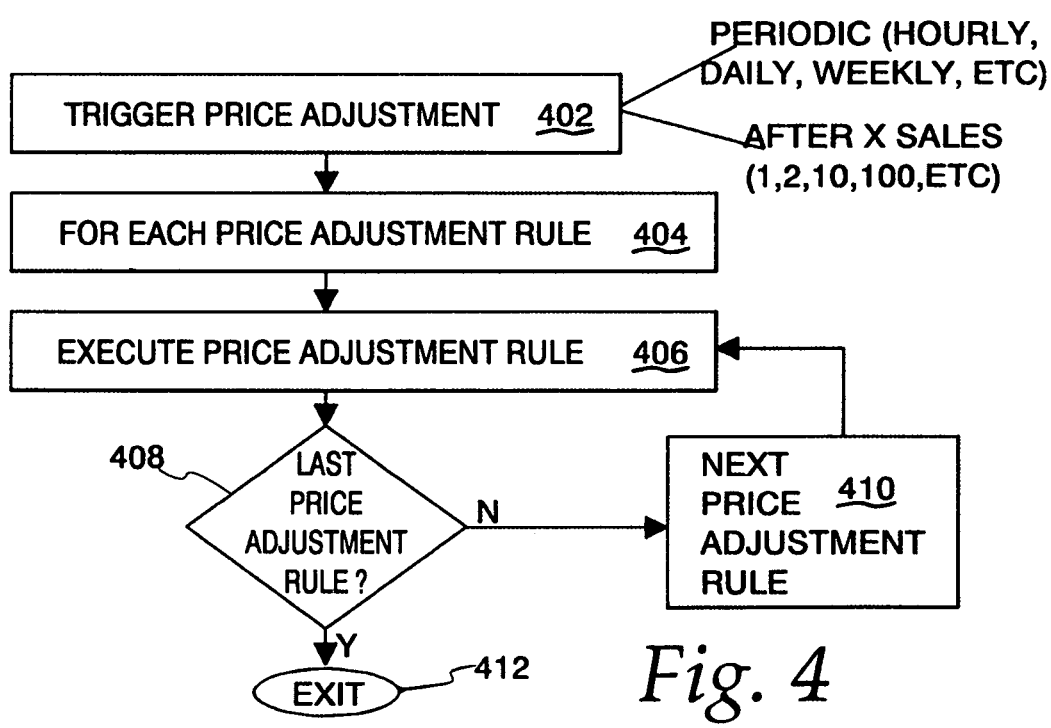
FIG. 4 is a simplified flow chart of a price adjustment algorithm for use with a vending machine constructed in accordance with this disclosure.

Turning to FIG. 4, a simplified flow chart depicting how price adjustment rules are applied by the disclosed vending machine 10 and mobile ordering system. The disclosed vending machine 10 can implement several price adjustment rules to maximize the value of goods sold as well as to drive certain objectives, such as encouraging consumers at certain locations to consume healthy foods. A listing of potential price adjustment rules is shown below:

Rule No. 1.
Rule Description Lower Price of Item No. 1 (Sliced Apples) When 72 Hours From Expiration.
Unadjusted Price $3.99.
Adjusted Price $2.49.
Rule No. 2.
Rule Description Lower Price of Item No. 1 (Sliced Apples) When 24 Hours From Expiration.
Unadjusted Price $3.99.
Adjusted Price $0.99.

Rule No. 3.

Rule Description Increase Price of Item No. 13 (Potato Chips) From 1 Hour Before High Traffic Event Until 1 Hour After High Traffic Event.

Unadjusted Price $0.99.

Adjusted Price $1.29.

Rule No. 4.

Rule Description Increase Price of Item No. 13 (Potato Chips) If More Than 3 Purchases Within Last Hour.

Unadjusted Price $0.99.

Adjusted Price $1.39.

Rule No. 5

Rule Description Decrease Price of Item No. 13 (Potato Chips) If Less Than 20 Purchases Within Last Thirty Days Unadjusted Price $0.99

Adjusted Price $0.79

Rule No. 6

Rule Description Decrease Price of Item No. 13 (Potato Chips) If Less Than 10 Purchases Within Last Thirty Days Unadjusted Price $0.99

Adjusted Price $0.59

Such rules can be used for inventory management, as well as to implement manufacturer programs; i.e., nationwide discounts, area discounts, or other types of promotions from a specific manufacturer. All of these price adjustment rules and other price adjustment rules based on user-created combinations of the initial price, an adjusted price, time in days or hours before item expiration date, item quantity, sales of an item within a period in hours or days, and time in hours or minutes before a high traffic event can be implemented using the algorithm shown in FIG. 4. In step 402, the price adjustment algorithm is triggered. The price adjustment algorithm can be triggered in several ways depending on the particular implementation of the vending machine. However, some ways that the price adjustment algorithm can be triggered would be periodical, such as once per minute, once per hour, etc., or after a particular number of sales, such as after every sale, after every two sales, or after every ten sales. Other trigger mechanisms can be used as well; i.e., the price adjustment algorithm can be triggered after a particular dollar volume of sales, etc.

Turning to step 404, the list of price adjustment rules is iterated through by the algorithm, starting with the selection of the first price adjustment rule. Next, in step 406, the presently selected price adjustment rule is executed; i.e., if the presently selected rule is rule number 1, that rule is executed; if the presently selected rule is rule number 2, that rule is executed, etc. Taking rule number 1 listed above as an example, one way that the rule could be executed would be for the processor 220 to verify with the inventory database 218 that there were still sliced apples to dispense. The processor 220 would then reference the database 218 to check the expiration date of the sliced apples and compare it to the present date and time using the clock 222, and if the expiration date of the sliced apples were within 72 hours of the present date and time, the processor would adjust the price of the remaining sliced apples from $3.99 to $2.49. Similarly, taking rule number 3 as an example, one way that the rule could be executed would be for processor 220 to verify with the inventory database 218 that there were still potato slips to dispense. The processor 220 would then reference the database 218 to determine if there were any high traffic events. If so, the processor would iterate through the high traffic events, and consult the clock 222 to check whether the present time was within the range of 1 hour before the high traffic event until 1 hour after the high traffic event; if so the processor would adjust the price of potato chips from $0.99 to $1.29.

In step 408, a check is made to determine if the selected price adjustment rule is the last price adjustment rule. If not, execution transitions to step 410, where the next price adjustment rule is selected. For example, if the presently selected price adjustment rule is 1, then price adjustment rule 2 would be selected. However, in step 408, if the last price adjustment rule is presently selected, execution would transition to step 412, and the price adjustment algorithm is exited.

Figure 5:
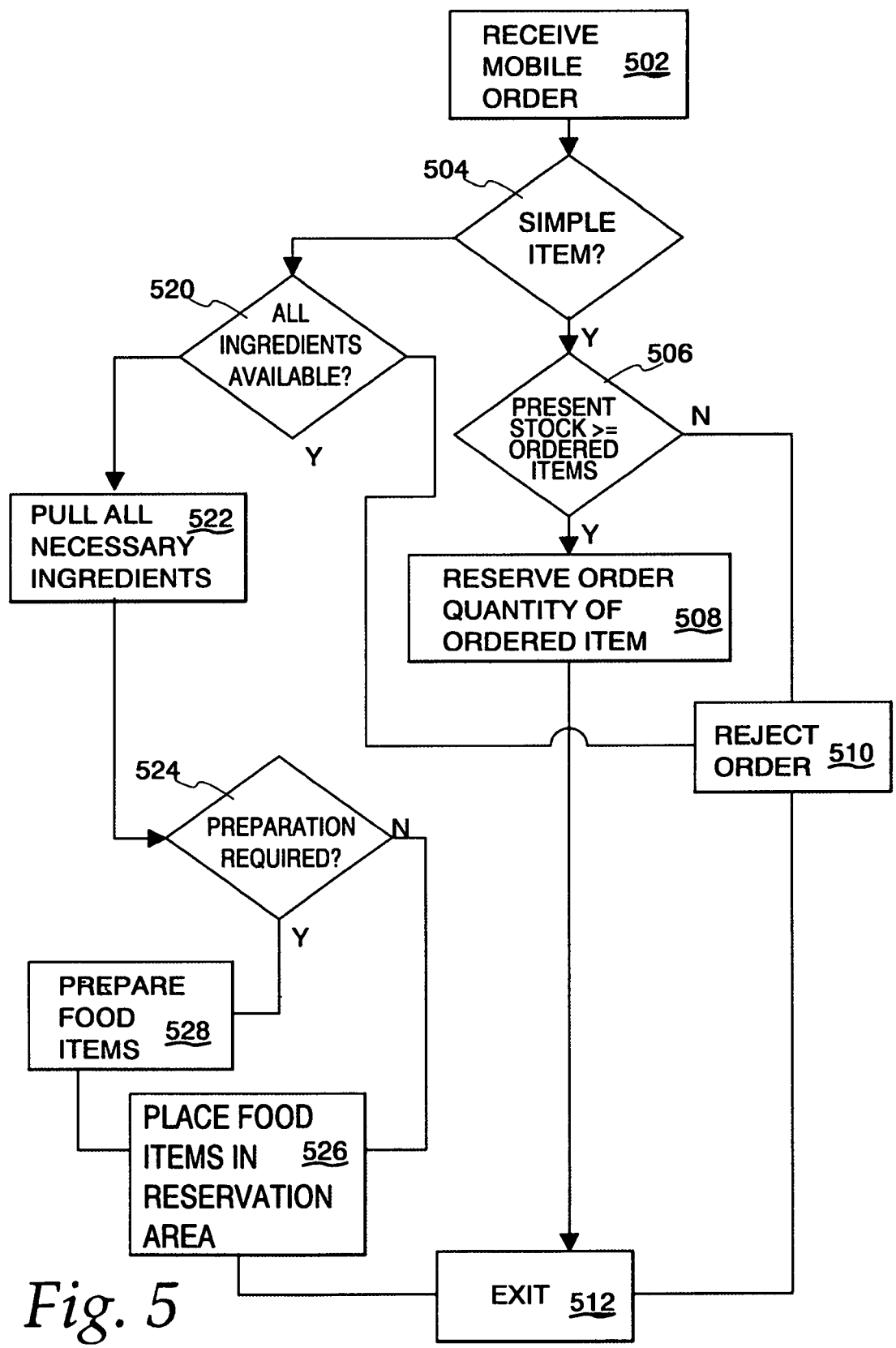
FIG. 5 is a simplified flow chart of a mobile order algorithm for use with a vending machine system constructed in accordance with this disclosure.

Turning to FIG. 5, a simplified flow chart depicting how mobile orders can be accepted by a vending machine constructed in accordance with this disclosure. In particular, mobile and web customers will make orders via their devices using the Internet 300. The server farm 302 will then process those orders, ensure availability using the database 304, and process payment using the payment processor 308. The order will then be routed to a particular vending machine 10, where it is processed using the algorithm disclosed in FIG. 5.

In step 502, the mobile order is received by a particular vending machine 10. In step 504, the processor 220 consults the database 218 to determine if the item is a simple item or an item that requires preparation or has optional ingredients. If the ordered item is a simple item execution transitions to step 506, where a check is made to determine if there is sufficient remaining inventory of the ordered item. If yes, execution transitions to step 508, where the processor 220 reserves the number of the ordered items, i.e., it will prevent that number of items from being vended or ordered by others. On the other hand, at step 506, if there is not sufficient inventory of the ordered item, execution transitions to step 510, where the processor uses the network interface 230 to notify the server farm 302 that the order was rejected, after which the algorithm is exited in step 512.

Returning to step 504, if the ordered item is an item that requires preparation or has optional ingredients, execution transitions to step 520, where the processor 220 consults the database 218 to determine if all of the ingredients for the order are available. If all ingredients are not available, execution transitions to step 510, where the order is rejected, and the server farm 304 is notified using the network interface 230, after which the algorithm exits in step 512.

At step 520, the processor 220 identifies all necessary ingredients using the food dispenser 224 and the optional ingredient storage of the food preparation module 240. Execution then transitions to step 524, where a check is made to determine if preparation is required. If no preparation is required, execution transitions to step 524, where the order is placed into a vending package and stored in the vended item storage area 242. However, at step 524, if preparation is required the items requiring preparation are prepared (generally heated) in the food preparation area 240 at step 528, after which the prepared food item is placed onto a vending package along with any optional ingredients and stored in the vended item storage area 242 in step 526. The algorithm then exits in step 512.

The server farm 302 can also offer special deals to vending machine customers. In particular, the server farm 302 can monitor sales of particular goods which are under performing or near their expiration date, and, as desired, offer nearby customers special deals. In particular, where a mobile device user 320 has an appropriate application installed on her mobile device, the server farm can periodically send "offers" to the user's device. Then, when the user comes close to a vending machine 10 for which an offer is made, the offer can display on the user's mobile device. Offers can be of a variety of types. An offer can be a straight discount, which can be used when it is desirable to move a particular product, such as when an expiration date is approaching, or when a product is a poor performer and the product is being offered on clearance. An offer can be an enticement, such as "buy one, get one free," or "buy one, and get one at 50% off." An offer can also be a promotion to encourage certain behavior, such as healthy eating, which could offer discounts on healthy foods (or foods with good grades). An offer can also be a free trial (or sample) of a product, as detailed in the algorithm of FIG. 6b.

Figure 6A:
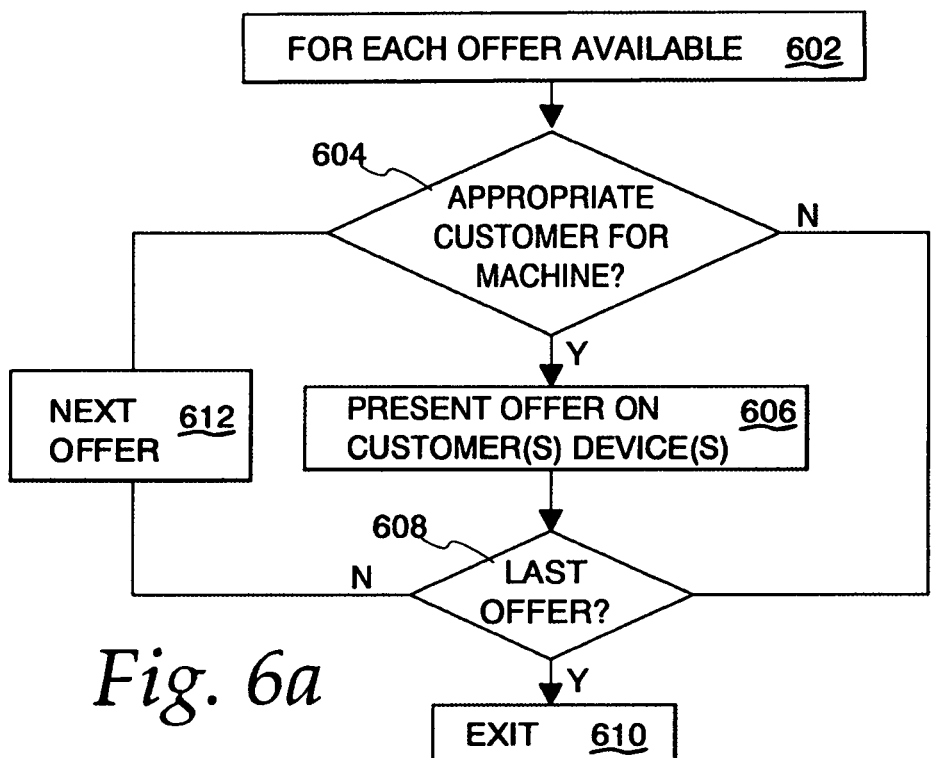
FIG. 6a is a simplified flow chart of an offer algorithm for use with a vending machine system constructed in accordance with this disclosure.
Figure 6B:
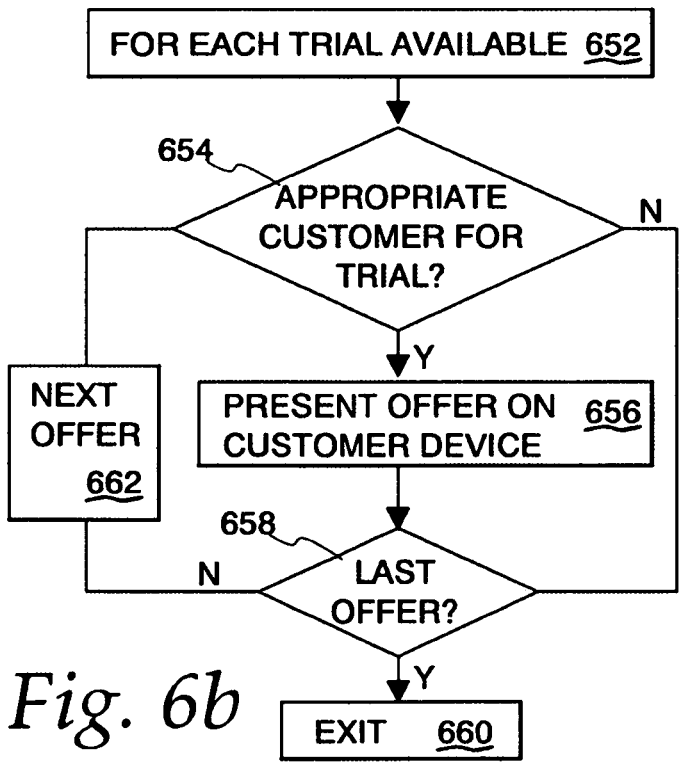
FIG. 6b is a simplified flow chart of a product trial algorithm for use with a vending machine constructed in accordance with this disclosure.

Offers can be made to vending machine customers using the algorithm of FIG. 6. In step 602, the processor on the mobile device iterates through the offers that have been downloaded to the mobile device, starting by selecting the first offer. In step 604, the mobile device processor determines if the customer appropriate for an offer from the particular vending machine. In particular, in step 604, the mobile device processor can determine if the customer is near any appropriate vending machine 10 using the location function of the customer's mobile device OR if the customer has ordered from that particular vending machine before—in the latter case, even if a customer is far away from a particular vending machine, the customer may be interested in an item that she can pick up at a later time. If not, the algorithm exits in step 610. However, in step 604 if the customer is near an appropriate vending machine, execution transitions to step 606, where the offer is presented to the customer on the customer's mobile device. In particular, a push notification such as that depicted in FIG. 11a can be presented, which, if selected, can present an in-app offer, such as that depicted in FIG. 11b. Both the push notification and in-app offer are discussed in more detail with regards to those figures.

In step 608, a check is made as to whether the presently selected offer is the last offer downloaded to the device. In step 608, if the presently selected offer is not the last, then execution transitions to step 612, where the next offer is selected, after which execution transitions to step 604. Similarly, at step 604, if the customer is not near an appropriate vending machine 10 for the presently selected offer, execution transitions to step 612, where the next offer is selected. In step 608, if the presently selected offer is the last, execution transitions to step 610, where the algorithm is exited.

As briefly mentioned above, trial offers (or free samples) can be offered to certain users. Trial offers can be generated by the vending machine operator, or by the item manufacturer using a supplied interface. A trial offer can made via a text message or an email message, and in such cases, will generally comprise a single use code in the message that the customer will need to enter within an app or web page. Alternatively, a trial offer can be made directly in app, in which case, the offer would be accepted by the user. Once an offer is accepted by the user, the offer is retired (not offered again). The algorithm by which such trial offers are made is shown, in simplified form, in FIGS. 6b and 6c. Starting in step 652, the processor of the mobile device can iterate through trial offers that have been downloaded to the mobile device using a vending app. In step 654, a check is made to determine if the particular customer is appropriate for the trial offer. The check in step 654 can include a check as to whether a vending machine stocking the trial offer product is located close to the customer, or whether a vending machine that the customer has ordered from before has the trial product offer, as well as an examination of the customer's prior purchasing history—in particular, if the customer has purchased similar or competing products before the trial offer may be made to the customer. If the customer is not appropriate for the selected trial offer, execution transitions to step 658, where a check is made to determine if the selected trial offer is the last trial offer that has been downloaded to the customer's device.

However, if the customer is appropriate for the trial offer, execution transitions to step 656 where the trial offer is presented to the customer on the customer device. After this, execution transitions to step 658, where a check is made to determine if the selected trial offer is the last trial offer downloaded to the customer's device. If the selected trial offer is the last trial offer, then execution transitions to step 660, where the algorithm is exited. However, if there are more trial offers then execution transitions to step 662, where the next trial offer is selected, and then to step 654, where a check is made to determine if the newly selected trial offer is appropriate for the customer.

Figure 6C:
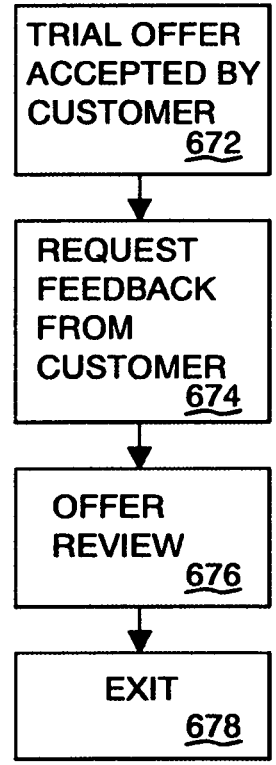
FIG. 6c is a simplified flow chart of an algorithm for gathering feedback from a vending machine customer.

Turning to FIG. 6c, an algorithm is described by which a review can be gathered from customers that accept trial offers. In particular, the algorithm of FIG. 6c would be automatically initiated a fixed period of time after a user accepted a trial offer. For example, the algorithm of FIG. 6c could be initiated approximately 2 hours after a customer accepted a trial offer. In step 672, the algorithm is initiated. In step 674, an application or web interface on the customer's device requests a review from the customer on the trial offer product that the customer accepted. In step 676, the customer can optionally be offered a reward for the review that was obtained. The reward can be, for example, a small amount of currency to spend with the vending machine system, a discount on an amount of purchases, or another free product. In step 678, the algorithm exits. A review will generally include, for example, the product, and the specific vending machine (including the location of the specific vending machine) from which the trial product was obtained, as well as the user's demographic information; i.e., ethnicity, age, race, approximate income, etc.

Other modifications can be made to the trial offer algorithm. For example, a customer can be prevented from obtaining any other trial offers, unless she has provided a review for the first one. Alternatively, if a customer does not provide a review for a trial offer at the first prompting, the customer can be prompted multiple times at different intervals. For example, the first prompt can be made at 2 hours, the second prompt at 24 hours, and a third prompt at 72 hours.

A mobile app or web interface for customer use can also include additional features. For example, the mobile app or web interface can allow a customer to request that a vending machine offers a particular item or items; i.e., the customer can create a wishlist.

Figure 7A:
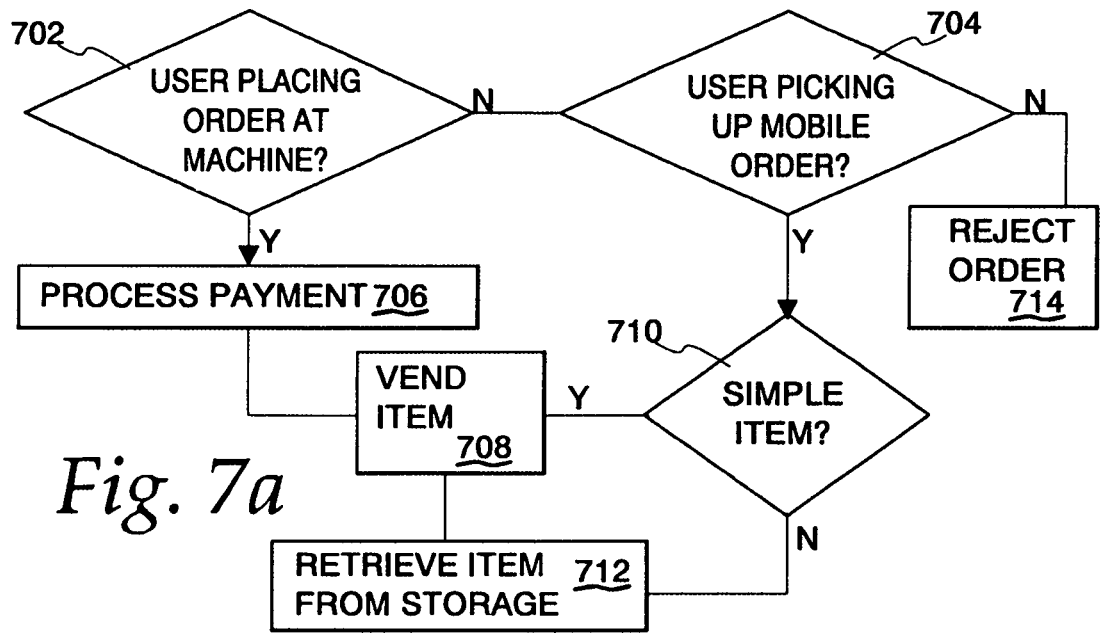
FIGS. 7a and 7b are a pair of simplified flow charts of a vending algorithm for use with a vending machine system constructed in accordance with this disclosure.

The primary purpose of the disclosed vending machine 10 is to vend items, and the overall process by which that is done is disclosed in FIG. 7a. In step 702, if the user is placing an order at the machine, execution transitions to step 706, where payment is processed using the payment processor 13. The item is then vended in step 708. Returning to step 702, if the user is not placing an order at the machine, execution transitions to step 704, where a check is made to determine if the user has an order to pick up at the vending machine 10. If not, a mistake must have been made (the user was told to pick up an order from the wrong machine, etc.), and the order is rejected in step 714. Any payment made by the user should be refunded as well.

Returning to step 704, if the user is picking up a mobile order, execution transitions to step 710, where a check is made to determine if the user is picking up a simple item. If so, the item is vended in step 708. However, if the item requires preparation or has optional ingredients, the vending package is retrieved from storage in step 712 and then vended in step 708.

Figure 7B:
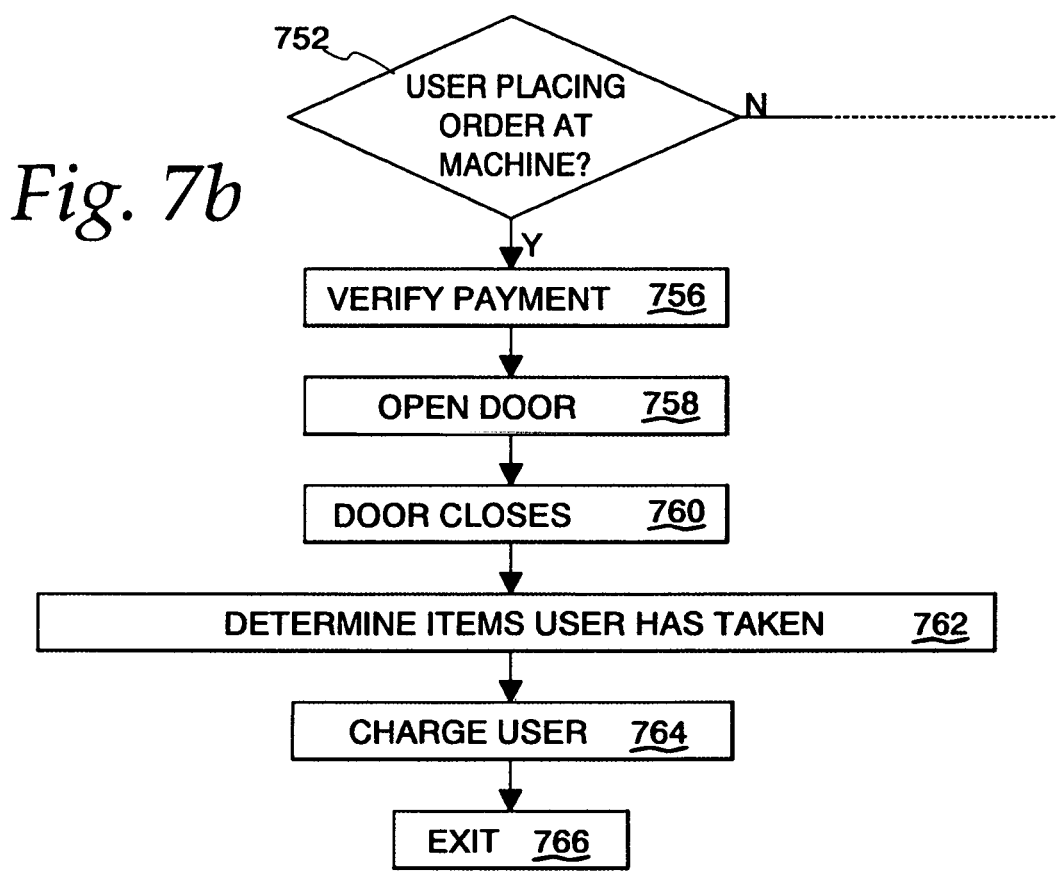

An alternative vending algorithm is shown in FIG. 7b. In particular, if a user is picking up an item or items that were ordered remotely using a mobile device or web interface, this algorithm will function identically to that discussed with regards to FIG. 7a. However, if a user is placing an order at the vending machine 10, the algorithm differs. In particular, in step 752, if the user is placing an order at the machine, execution transitions to step 756. Otherwise, execution will proceed from step 704 in FIG. 7a. In step 756, the vending machine 10 will verify payment using the payment processor 13; however, it will only verify a type of payment that can be contractually charged at a later time and tied definitively to a particular person, such as an e-wallet. Once payment is verified, the vending machine 10 will open up access to the item bins; for example, the front of the machine will open, and allow the customer to take whatever the customer wants to take. The customer will then either close the door in step 760, or the door will automatically close after no weight change is detected in any of the bins for a period of time; once the door is closed, access to the items in the vending machine 10 is shut off, and the items that the customer has taken are determined in step 762 by the processor 220. One way that the processor 220 could determine what is taken by the customer would be to measure the difference in weight of each bin before the door was opened and after the door was closed using a weight sensor in each bin. After an inventory of the items taken by the customer is determined in step 762, the customer is charged in step 764, after which the algorithm exits in step 766.

Figure 8:
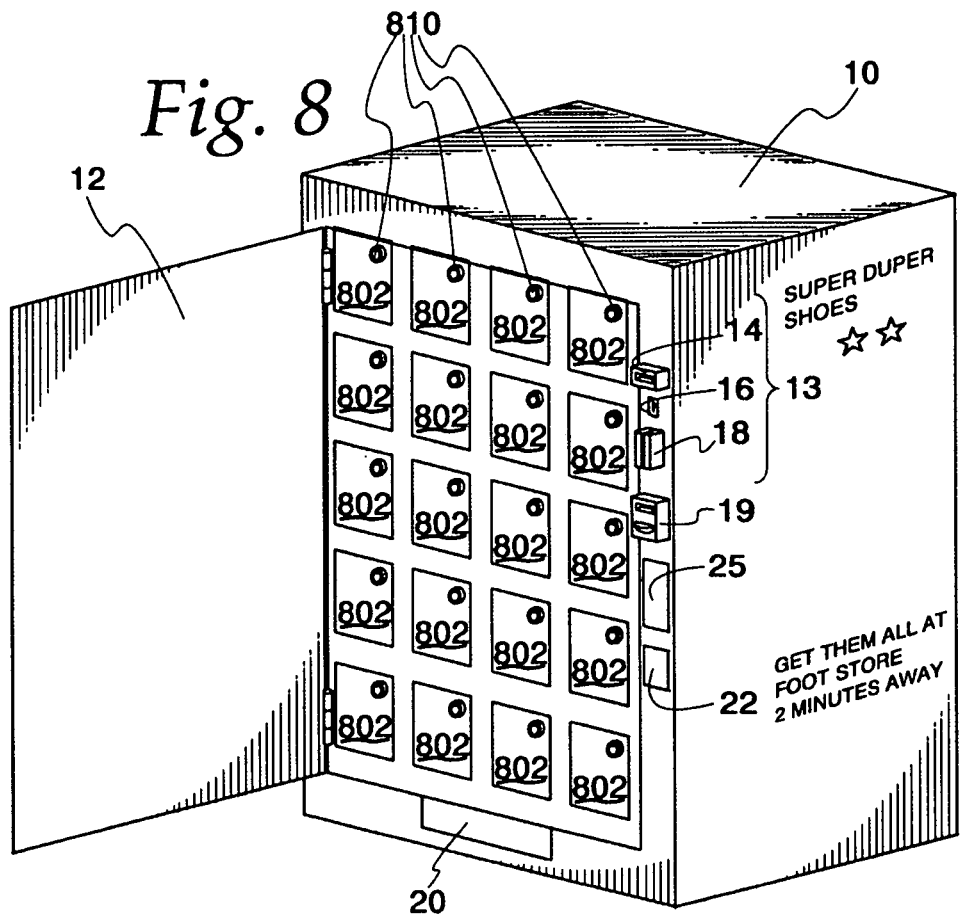
FIG. 8 is a perspective view of the back of a vending machine constructed in accordance with this disclosure.

One of the objectives of the disclosed vending machine is to allow multiple vendors to access the vending machine. To accomplish this, the vending machine allows a plurality of vendors to offer their food through the vending machine, and, to accomplish this, allows each item slot to be accessed and loaded independently. In particular, once the front panel 12 is opened, as depicted in FIG. 8, the item bins 802 are uncovered and accessible by a vendor. The front panel 12 can be opened using the access point 22, which, as discussed above, can be an electronic or physical lock. As shown, each item bin has an independent locked door 802. In particular, each door 802 has an independent lock 810. The authentication mechanism of the lock 810 can be a simple key, or it can utilize an electronic (app-based) authentication mechanism, i.e., a code sent from the app through the server farm 302 and relayed to the vending machine 10.

Figure 9:
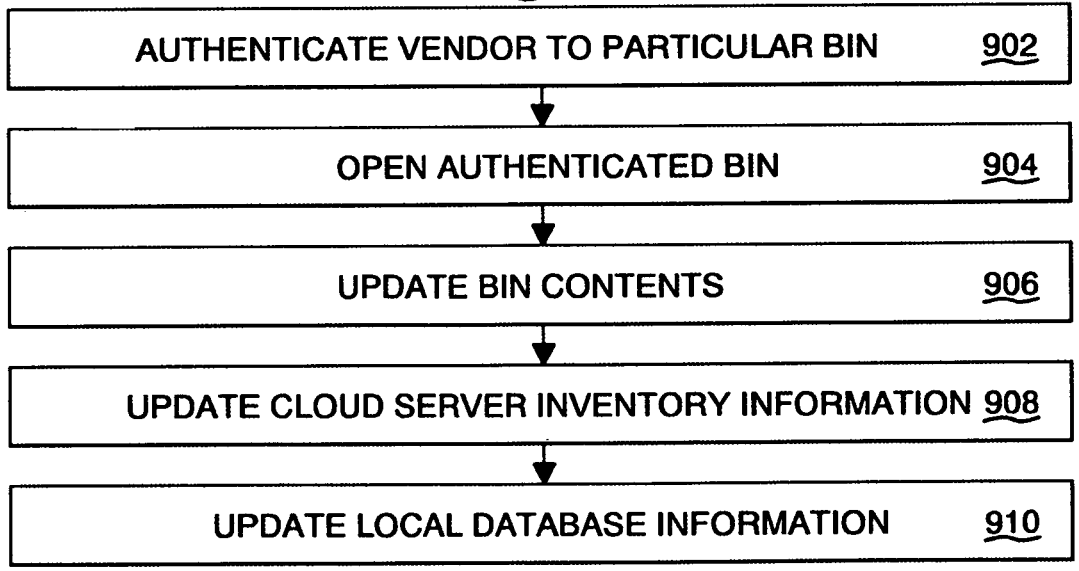
FIG. 9 is a simplified flow chart of a process by which a vendor can restock items stored in the vending machine.

Turning to FIG. 9, a process by which a vendor can access a particular item bin, and update the inventory of the items stored in the bin. In particular, in step 902, the vendor is authenticated to the bin. This authentication is through the lock 810 and can include a variety of authentication mechanisms. For example, authentication can be by way of a physical key, a fingerprint reader, a camera used for a retina scan or face identification, or by way of an electronic lock that is authenticated by way of an app running on a user's mobile device. It should be noted that a particular vendor can operate a single bin or several consecutive or non-consecutive bins, and a vendor that operated multiple bins would not need to be authenticated for each bin that the vendor operated. Rather, a single authentication would allow a vendor to access all of the bins that she operates.

After the vendor is authenticated, the authenticated bin or bins are opened in step 904, allowing the vendor to access the items in those bins. The vendor would then reload the items in the bins in step 906. In step 908, the cloud server inventory information, i.e., the database 304, is updated. The cloud server inventory information be updated by the vendor updating the cloud server inventory information. For example, if the vendor added four bags of potato chips to a potato chip bin, the vendor would add in each new item along with the expiration date for each to the database using an interface provided by the vending machine 10, a web interface, an app on the user's mobile device, or some other means. Alternatively, the vending machine 10 can utilize circuitry and programmatic intelligence to update the inventory information at the database 304. In particular, the vending machine can utilize, for example, a weight sensor in each bin, and any difference in weight would be noted at the processor 220. Using the difference in weight, as well as the average weight of the product in the bin, the processor 220 could then estimate the change in inventory, and send this quantity to the server farm 302. The new inventory could then be presented to a vendor on an application for confirmation, as well as input of additional information, such as expiration date, etc. Once the cloud server inventory information was updated, the server farm 304 would then update the vending machine's 10 local database 218.

Figures 10A, 10B:
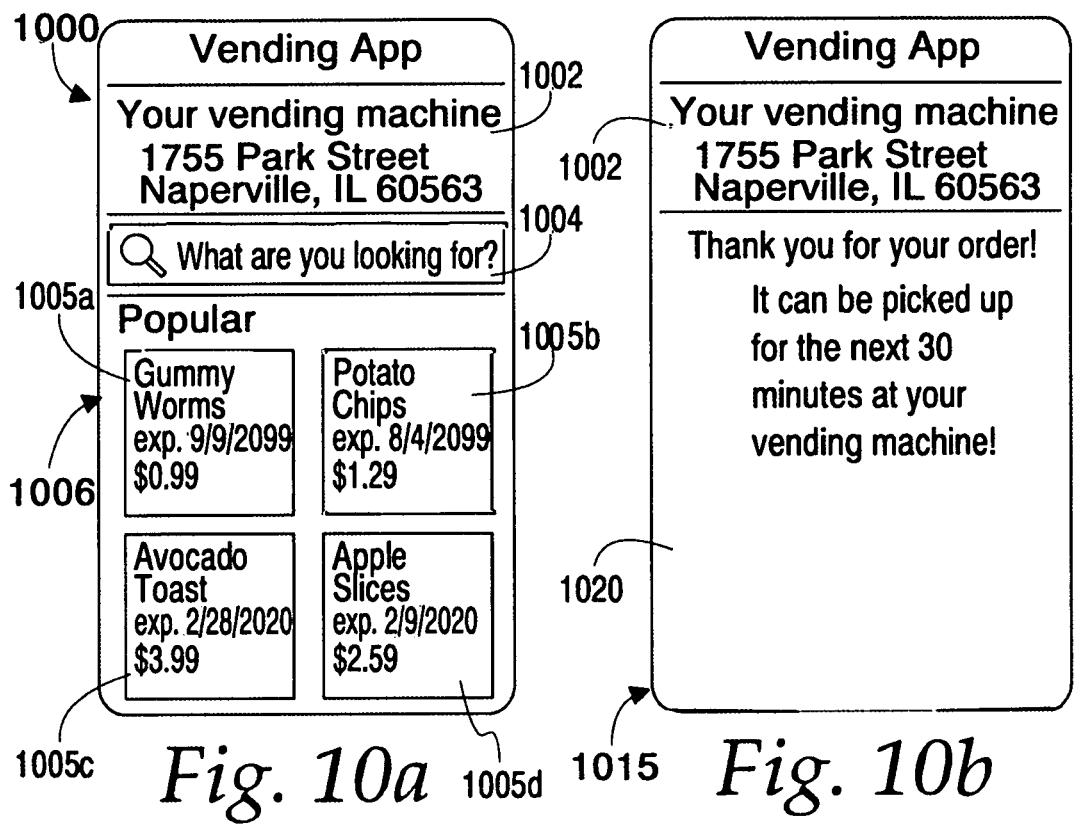
FIGS. 10a and 10b are screenshots of an application for placing a mobile order with a vending machine system constructed in accordance with this disclosure.

Turning to FIG. 10a, a mobile ordering interface 1000 is shown. The mobile ordering interface 1000 could operate on a user's mobile device as an app or could be in the form of a web page. As depicted, the mobile ordering interface 1000 comprises an address field 1002. The address field 1002 shows the physical address of the building that the vending machine is in, and can include, for example, a floor number or suite number. Also, by pressing on the address field, the user can be given the option to receive directions, or even to launch an application for directions. The mobile ordering interface 1000 also includes a search field 1004, which allows a user to search for a particular item, i.e., chips, candy bars, fruit, burgers, curry, etc. Finally, the mobile ordering interface 1000 includes an item panel 1006, which displays the items matching a user's search, or (as depicted) a ranking of featured or popular items. As depicted, the item panel 1006 displays four items 1008a, 1008b, 1008c, 1008d; however, it should be noted that any number of items can be displayed.

FIG. 10b shows an order confirmation screen 1015, i.e., a screen after an order has been placed. As depicted, the order confirmation screen 1015 includes an address field 1002, which functions identically as discussed with respect to the mobile ordering interface 1000. In addition, the order confirmation screen 1015 includes a confirmation field, thanking the user for the order, and indicating that the order can only be picked up for a limited time, or it will be forfeit or subject to an additional cost.

Figures 11A, 11B:
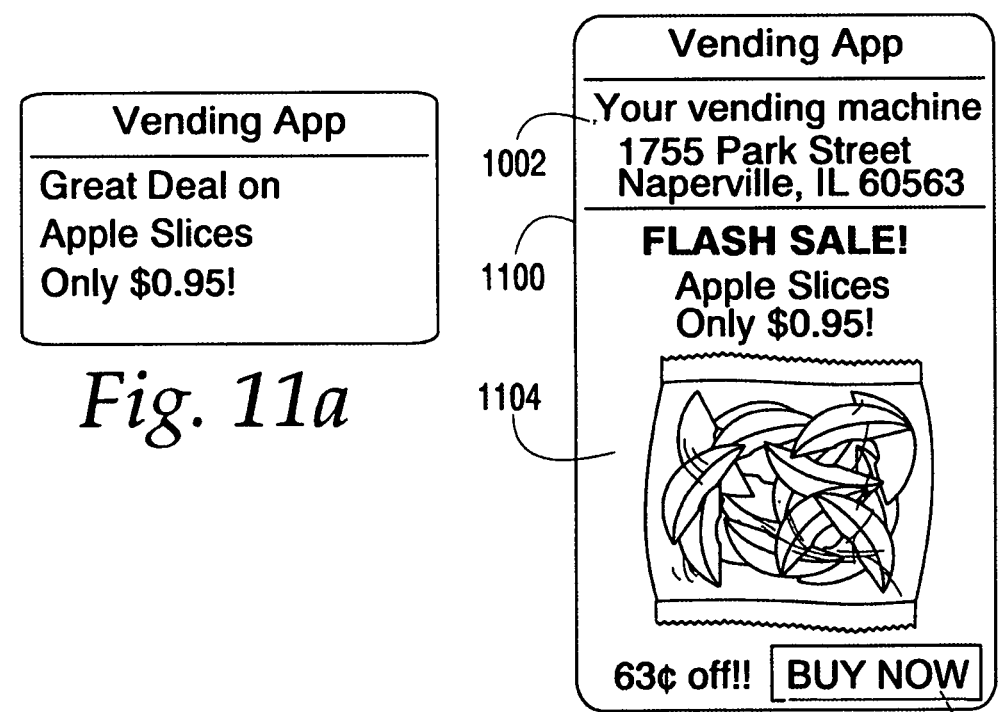
FIG. 11a is a screenshot of a push notification for a special offer for a vending machine item.
FIG. 11b is a screenshot of an application for accepting a special offer of a vending machine item.

Turning to FIGS. 11a and 11b, a special offer interface is shown. In particular, the disclosed vending machine 10 can utilize push notifications, such as that depicted in FIG. 11a. The push notification would only be sent to the user if she was within a certain distance of the vending machine, such as 1 mile or two blocks. The push notification would work as such notifications typically do; i.e., it would present the deal to the user, and, if the user selected the push notification, it would take the user into the application, where an offer page, such as that depicted in FIG. 11b, would be displayed.

The offer page 1100 includes an address field 1002, which shows the location of the vending machine for which the offer applies—the address field 1002 functions as discussed previously. The offer page 1100 also includes an offer panel 1104. The offer panel 1104 displays the item, details of the offer including the new price and discount, and an order interface 1106, which allows the user to purchase the offered item.

One of the objectives of the disclosed vending machine is to encourage users to purchase fruits, vegetables, and other healthy foods. To help accomplish this objective, reports on ordered and vended food can be obtained by monitors. Monitors can include, for example, parents, guardians, coaches, school teachers, insurers, physicians, and employers. In particular, a monitor can be given a report card that summarizes a user's food purchases over some time, such as, for example, one month. An example report card 1200 is depicted in FIG. 12.

As depicted, the report card 1200 includes a name field 1202, that shows the monitored user's name. The report card 1200 also displays a visited machine field 1204 that shows the number of vending machines that were visited, and, if selected, can show a listing or map of the vending machines that were visited, including the specific locations and addresses of the visited vending machines. The report card 1200 also includes a summary of purchases 1206. The summary of purchases can also be selected to show the specific purchases, as well as the dates they were made, and a summary of their health information, i.e., nutritional grade, calories, sugar, fat, etc.

The report card 1200 also displays an overall grade 1208 for the monitored user. The monitored grade 1208 can also be selected, and a summary of the inputs to the grade can be displayed. Finally, if the monitored user's grade is good, the monitor can be given an option to reward the monitored user's good eating habits by giving the monitored user additional funds to spend in their wallet. The reward can be through a refill wallet control 1210. The refill wallet control 1210 can directly add funds to the monitored user's e-wallet or can add money to a custom e-wallet that can only be spent with the disclosed vending machine 10.

Finally, a monitor can, in an alternative embodiment, be notified if a monitored user attempts to make a particular type of purchase, such as a purchase of high sugar foods. The monitor can then approve the particular purchase or deny the particular purchase. For example, the monitor can receive an email, text message, or an app notification (push notification) indicating that the monitored person is attempting to make a proscribed purchase. The monitor would then be able to use the application to allow or decline the purchase. In another alternate embodiment, the monitor can pre-approve certain classes of food purchases, such as fruits and vegetables, while not allowing any other types of food purchases. In such a case, a monitor that attempted to purchase a high sugar food, such as a sugary soft drink, would not be able to make the purchase. Finally, in an alternate embodiment, a monitor can pre-approve certain classes of food purchases, such as fruits and vegetables. However, when a monitored user attempts to make a purchase outside of the pre-approved types of food, the monitor would receive a request to approve the food purchase; if allowed, the purchase would go through, and if denied, it would not.

The vending machine system described herein can also maintain individual customer profiles. Customer profiles can have two components; first, a portion that is created and entered by the customer, and second, a portion that is automatically created based on the user's purchases. With regards to the latter point, all purchases made by a particular user, including the item purchased, the amount paid, and the location of the vending machine where the item was purchased, will be maintained in the customer profile.

Figures 12A, 12B:
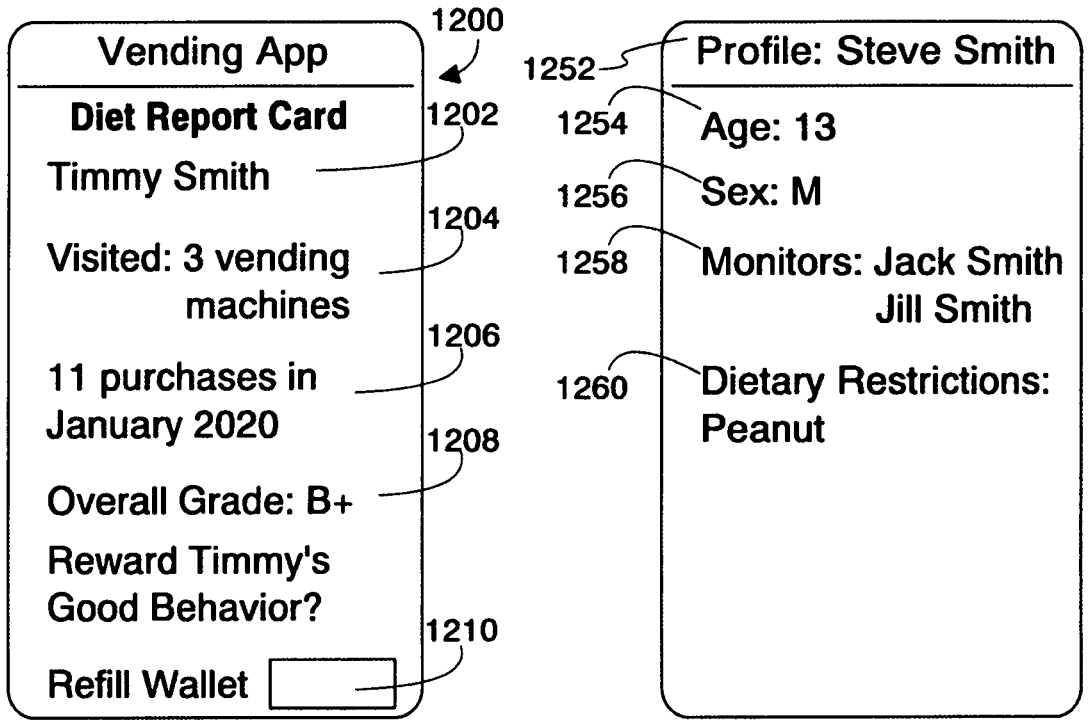
FIG. 12a is a screenshot of a monitor report for a monitored user.
FIG. 12b is a screenshot of a customer profile for a customer.

Turning to FIG. 12*b*, a screenshot of a customer profile is shown, including the information that is entered by the customer. Field 1252 shows the user's name, and field 1254 shows the user's age, while field 1256 shows the user's sex. The information contained in these fields can be manually entered by the user, or taken from an external source such as Facebook or Google. In field 1258 any monitors, such as those discussed previously, are setup. Once setup, the monitor field 1258 can be adapted to be no longer modifiable by the customer—rather, the monitor field 1258 would effectively be locked, so that a monitored customer would not be able to easily free themselves from the oversight of the monitor or monitors. Finally, the profile contains a dietary restriction field 1260. The dietary restriction field 1260 contains any dietary restrictions that the customer has; i.e., a peanut allergy, celiac (gluten), lactose (dairy) intolerance, etc. The dietary restriction field 1260 is used to completely block the customer from purchasing any foods that contain ingredients that are not allowed by the user's dietary restriction; for example, the customer shown has a peanut restriction; accordingly, any order's made by the customer for a food item with peanuts would be rejected by the vending machine, and the customer would be notified that the desired food item contains peanuts.

Figure 13:
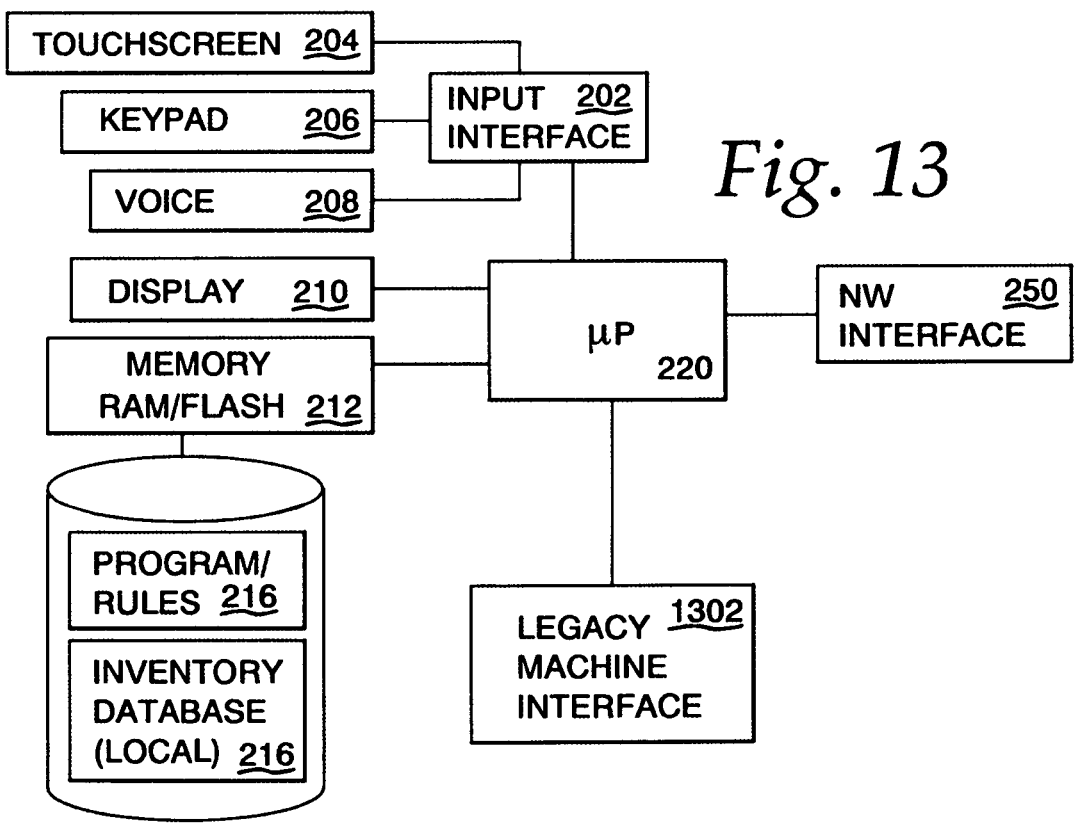
FIG. 13 is a simplified block diagram of an add on module for use with existing vending machines.

While the disclosed vending machine has been discussed in terms of a new type of vending machine, in an alternate embodiment, an add-on module can also be implemented, which could be used to retrofit existing vending machines with the upgraded capabilities outlined herein. Such an embodiment is illustrated in FIG. 13, where the components have similar functions to the components shown in FIG. 3*a*, with the exception of the legacy machine interface 1302, which is used to interface with the dispensing and payment processing functionality of the existing vending machine. Similarly, software implementing some or all of the features outlined herein could be sold to vending machine manufacturers to operate on generic hardware. The advantage of such an implementation is that some (although not all) of the features of the disclosed vending machine can be implemented at a lower cost and without wasting existing vending machine infrastructure.

Figure 14:
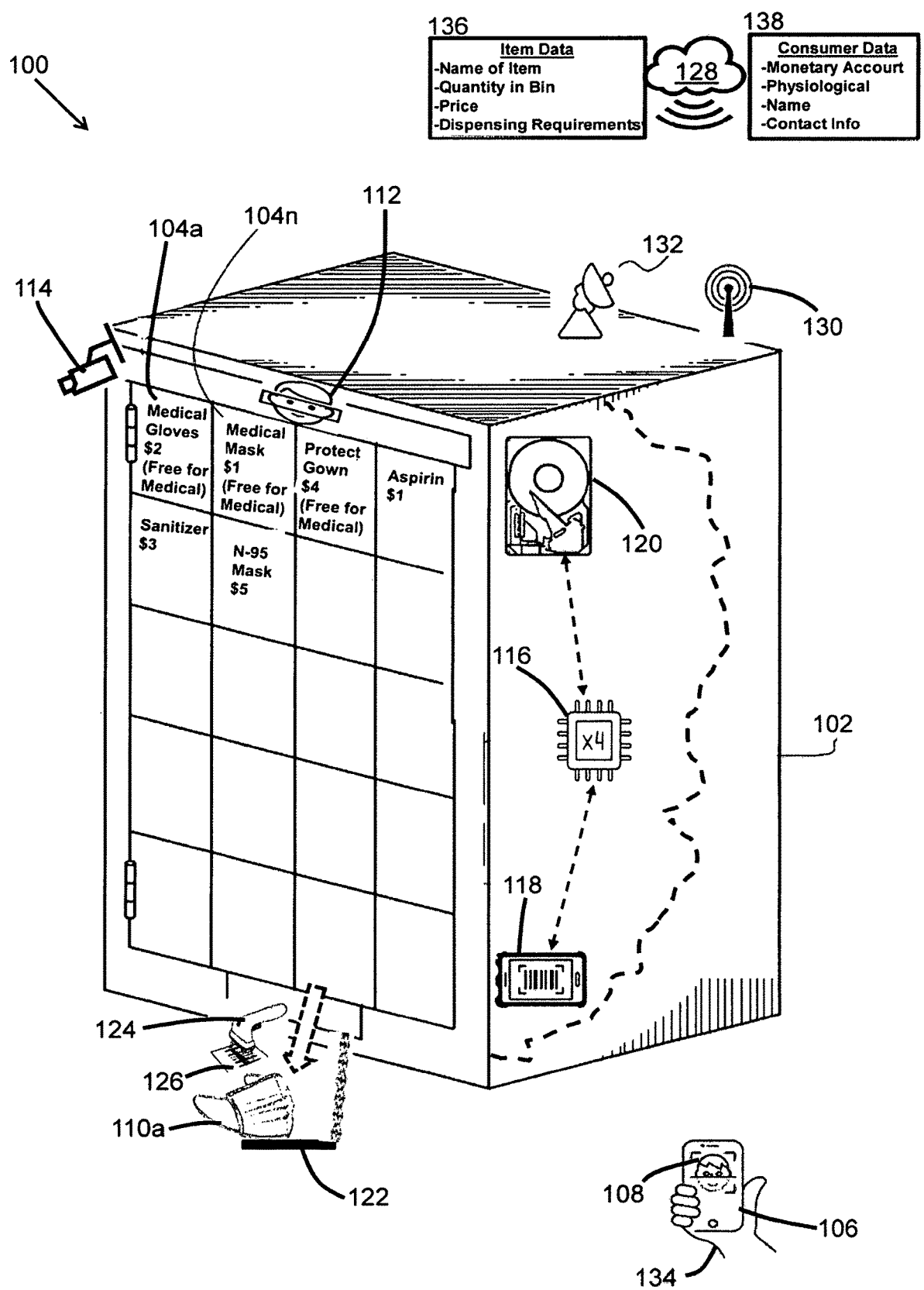
FIG. 14 is a block diagram of an exemplary vending system for contactless vending transactions.

In another embodiment of the invention, shown in FIG. 14, a vending system 100 for contactless vending transactions is configured for smart, contactless vending of one or more items 110*a-c*, which can include medical-related items used in treating a virus or other pandemic malady. The vending system 100 for contactless vending transactions, hereafter "vending system 100", is configured to enable a consumer 134 to access one or more items 110*a-c* from a vending machine while maintaining a substantially contactless relationship during the selection and collection of the items 110*a-c*.

This contactless relationship between consumer 134 and vending system 100 is achieved because the vending system 100 does not rely on the consumer 134 engaging a manual array of buttons and touch screens; not does the vending system 100 employ physical payments, such as cash, coins, or credit cards inserted into a vending machine controller 118. Rather, the vending system 100 utilizes a biometric reader 112 and/or a camera 114 to identify and qualify the consumer 134 for the vending transaction. A personal mobile communication device 106 of the consumer 134 may also be utilized to perform the vending transaction.

The vending system 100 is configured to dispense the items 110*a-c* after one or more dispensing criteria are achieved. In some embodiments, the dispensing criteria may include, without limitation: the physiological characteristics of the consumer, the amount of monetary funds available in a monetary account, the identification of the consumer, a limitation on item purchases, an expiration date of the item, an owner permission, and other criteria that must be achieved to dispense the items, as discussed below.

The biometric reader 112, the camera 114, and the mobile communication device 106 serve to determine if the dispensing criteria is available by recording physiological characteristics and images of the consumer 134, and comparing to pre-stored consumer data 138 and item data 136. For example, the biometric reader 112 compares the iris patterns and colors of the consumer 134, with the stored consumer data 138 that includes a digital pattern of consumer's iris. If there is a match, then one or more of the dispensing criteria are achieved, which triggers the vending system 100 to dispense the items 110a-c selected by the consumer 134.

The camera 114 operates substantially the same, with the captured image or video of the consumer 134 needing to match the consumer data 138 in order to meet the dispensing criteria. The mobile communication device 106 may be configured with both a biometric reader 112 and a camera 114 for similar verification functions.

Upon verification of the consumer 134, and achievement of the dispensing criteria, the vending system 100 transacts payment for the selected items 110a-c, dispenses the selected items 110a-c in a contactless manner, updates inventory of items 110a-c, records the purchase history of the consumer 134, and provides indisputable visual media (camera video) evidence of the transaction. Additionally, the vending system 100 is configured to scan the items 110a-c upon dispensing, so as to update item inventory and verify the transaction. Additionally, the vending system 100 may record the transaction with a camera 114, so as to indisputably prove that the consumer 134 received the selected items 110a-c.

As referenced in FIG. 14, the vending system 100 comprises a housing 102 that is sized and dimensioned to protectively encapsulate the electrical and mechanical components of the disclosure. The housing 102 also serves to retain and vend one or more items 110a-c, upon selection by a consumer 134.

The housing 102 is, in this case, depicted as rectangular cuboid housing 102 as is typical of vending machines. However, the housing 102 is not limited to a rectangular cuboid; for example, the housing 102 could be cubical, a triangular right prism, cylindrical, or other types of shapes. The housing 102 may also be configured to operate as a kiosk—either manned or unmanned. The housing 102 may also be defined by a front panel that is at least partially transparent to allow the items 110a-c to be displayed. In some embodiments, the housing 102 comprises a power source that powers electrical components used within the vending system 100. Power source may include an external power cable, or an internal battery or solar panel.

In some embodiments, a plurality of storage bins 104a-n are disposed inside the housing 102. The storage bins 104a, 104n are sized and dimensioned to retain one or more items 110a-c of a particular type. The storage bins 104a-n can be arranged in organized columns or rows so that the consumer 134 can visually inspect the items 110a-c without contact.

In one non-limiting embodiment, The housing 102 includes lighted panels that illuminate the items 110a-c in their individual storage bins 104a-n. The storage bins 104a-n can also form slots to hold the items 110a-c in an upright position for optimal visibility. In some embodiments, the slots that retains the items 110a-c may include a bracket or a spring biased latch that retains the items 110a-c in its respective slot, until dispensed. In other embodiments, a rotating coil may be used to retain and release the items 110a-c during dispensing. In yet other embodiments, a hook can be used to retain and release the items 110a-c for controlled dispensing.

Figure 17:
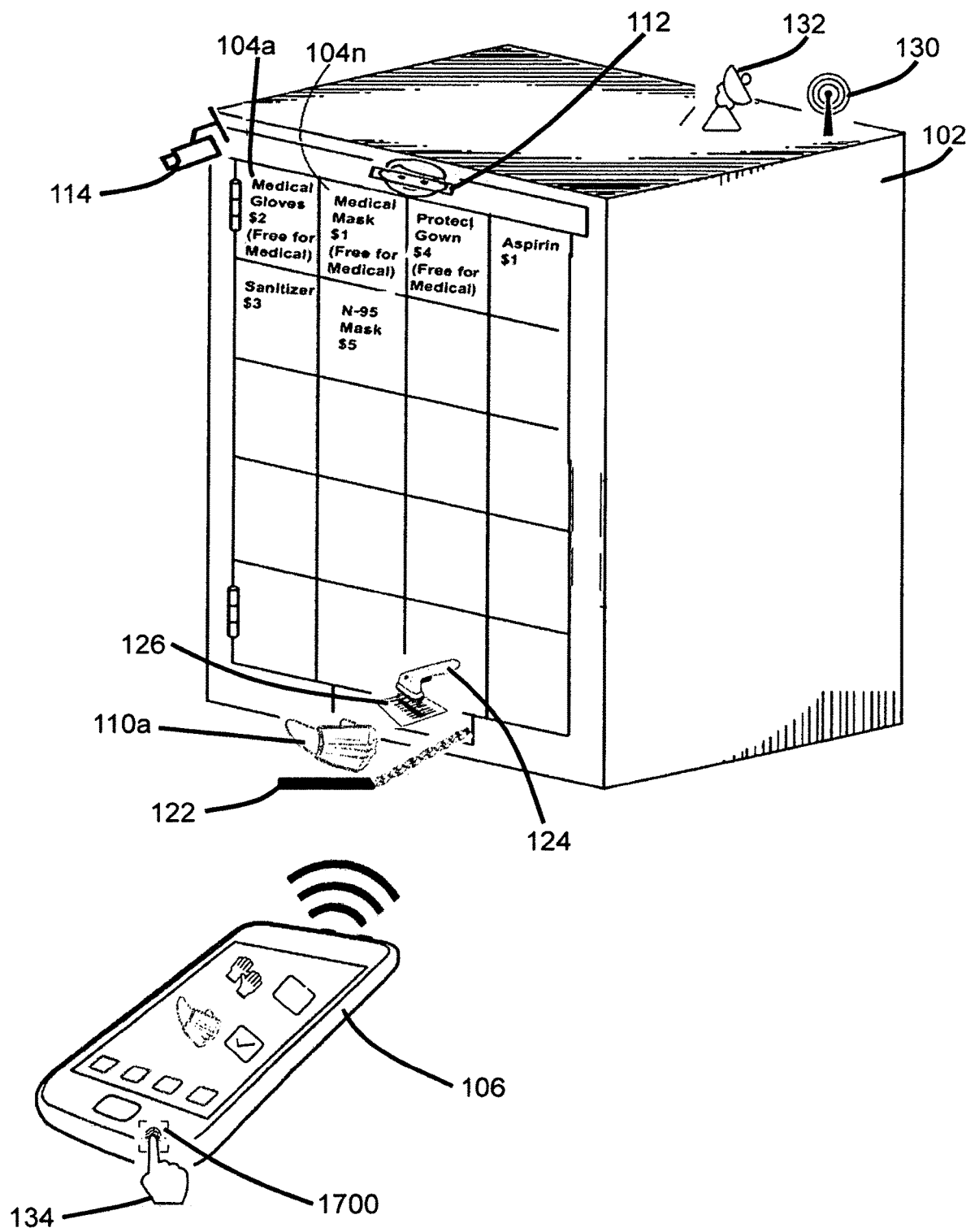
FIG. 17 is a mobile communication device performing a vending transaction with the vending machine controller.

As shown in FIG. 17, the consumer 134 performs a vending transaction while in proximity to the housing 102, which still maintains a contactless relationship therebetween. However, it is significant to note that the vending system 100 does not require the consumer 134 to be physically present near the housing 102 in order transact the purchase. In this arrangement, the consumer 134 may utilize a mobile communication device 106, described below, to select and purchase items 110a-c from a different room or region as the vending system 100.

The vending system 100 dispenses the items 110a-c when one or more dispensing criteria are met. As illustrated in FIG. 14, a vending machine controller 118 triggers the release of the items 110a-c from the storage bins 104a-n when the dispensing criteria have been achieved. Each item has a unique dispensing criteria, so that the number and type of dispensing criteria can differ for each item 110a-c.

For example, a dispensing criteria could be that a consumer 134 has funds in a monetary account linked to the consumer 134. Another dispensing criteria is that the selected item 110a is less than the amount of funds in the monetary account. When both of these dispensing criteria are met, the vending machine controller 118 is actuated to release the items to the dispenser 122.

In another example, the vending machine controller 118 can trigger the release of items for no charge when certain dispensing criteria are met. This is the case when the consumer 134 is verified as a medical professional, and is selecting commonly used medical-related items, i.e., medical mask, gloves, etc. The dispensing criteria may be that medical professionals, who are identified as that in their consumer data, are not charged for commonly used medical-related items. However, any number and combination of dispensing criteria may be preprogrammed into the processor 116 and vending machine controller 118 of the vending system 100.

In some embodiments, the items 110a-c may include, without limitation a protective medical mask 110a, an N95 mask, a medical glove 110b, a sanitizer, a medical garment, and medicine 110c. While the items 110a-c depicted in the vending system 100 are generally medical related items 110a-c, other embodiments of the vending system 100 may utilize any foodstuff, product, or service known in the art of vending that can be dispensed.

Figure 15:
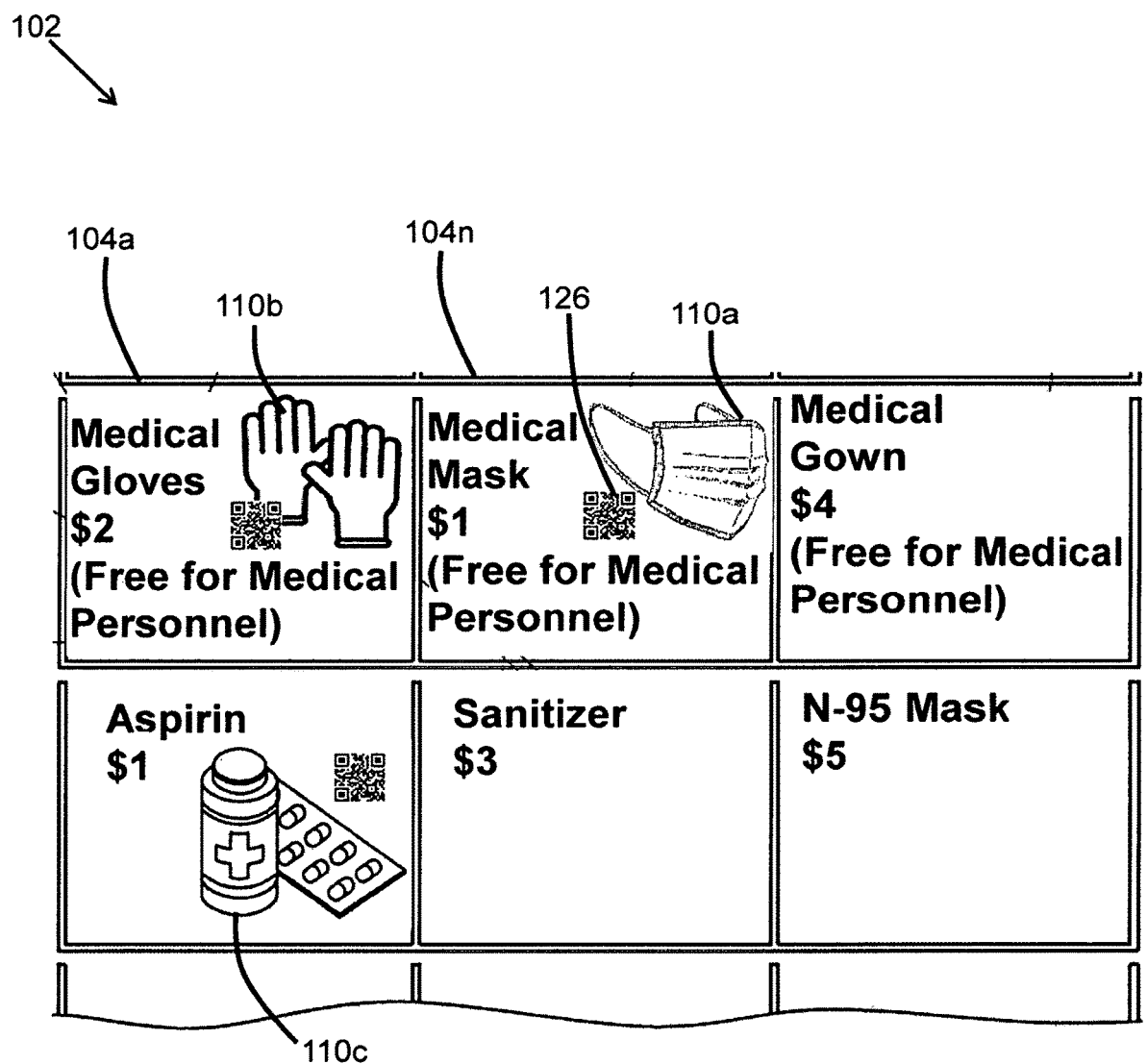
FIG. 15 is a front panel of the vending system, showing the storage bins retaining various medical items ready for dispensing.

As illustrated in FIG. 15, a view of several items 110a-c on the front panel is depicted. In particular, a first row of item slots and a second row of item slots are shown. Each of the item slots holds a particular item that is dispensed upon selection by the consumer 134. As illustrated, the first row depicts a first bin retaining medical gloves 110b sold for $2, but given free to medical professionals. A second bin retaining medical masks 110a sold for $1, but given free to medical professionals. A third bin retaining medical gowns sold for $4, but given free to medical professionals.

The second row of the front panel depicts a first bin retaining aspirin 110c sold for $1. A second bin retaining a sanitizer sold for $3. A third bin retaining an N-95 mask sold for $5. The items 110a-c can be interchanged, and their prices adjusted accordingly. Furthermore, in alternative embodiments, foodstuffs, and other products and services may also be vended.

To help identify the items 110a-c being dispensed, an item code label 126 is affixed to the packaging, or directly on, the items 110a-c. The item code label 126 may include a scannable QR code that links to item data 136 for the corresponding item. As described below, the item code label 126 is scannable, so as to determine purchase habits, item inventory, and to verify sales. However, in other embodiments, the item code label 126 can include alphanumeric digits, bar codes, and images. In any case, each item code label 126 is unique to an item, and has additional item data 136 linked thereto.

The vending system 100 requires a significant amount of processing power to conduct the vending transactions, determine dispensing criteria, store consumer data and item data, communicate with a remote data storage device, and operate biometric readers and cameras. Thus, a processor 116 is integrated into the housing 102. The processor 116 may include a microchip as is known in the art of vending machines. In such a scenario, the processor 116 can run software, including voice recognition software, communications software, and logic software for triggering controlled dispensing of the items 110a-c.

In some embodiments, a vending machine controller 118 is operatively connected to the processor 116. It is known in the art that a traditional vending machine controller triggers the release of items when cash, coin, or other form of payment is inserted therein. However, for the present vending system 100, the vending machine controller 118 is configured to trigger the release of the items 110a-c from the storage bins 104a-n when one or more dispensing criteria is achieved.

However, for both versions, the vending machine controller can utilize a timer, a logic circuit, various types of switches, and a power source to operate. These components allow the vending machine controller 118 to trigger the items 110a-c for dispensing upon receiving a signal that one or more dispensing criteria have been met. In one possible embodiment, the vending machine controller 118 is remotely monitored through a network to determine operatiability and also to monitor the items 110a-c dispensed.

The dispensing criteria necessary to dispense the items 110a-c is a predetermined standard unique to each item and verified consumer 134. It is significant to note that different items 110a-c may have different dispensing criteria, depending on the consumer 134 who is conducting the vending transaction. For example, a medical mask may be in short supply; and thus only a medical professional may be allowed to purchase the medical mask.

In another example of dispensing criteria, a medicine or a food item that is expired is restricted from dispensing because it does not meet a date expiration dispensing criteria. Other examples of dispensing criteria are discussed below. In any case, the vending system 100 can be programmed to regulate the items 110a-c that are dispensed by the vending machine controller 118, based on eclectic types of dispensing criteria.

As discussed, the items 110a-c in the storage bins 104a-n are different, and thus require different dispensing criteria. Thus, the vending system 100 utilizes a vending machine memory 120 to store much of the item data 136. The vending machine memory 120 is operatively connected to the processor 116, so that processing and memory functions work in conjunction, creating dispensing synergy. In some embodiments, the vending machine memory 120 may include, without limitation, a memory chip, RAM, ROM, and FLASH.

The vending machine memory 120 is operable to store the item data 136, which is simply data related to the items 110a-c. Such item data 136 can include the type of items, the price of the items, the number of items inside the storage bins 104a-n. The item data can also be a part of the calculus for achieving the dispensing criteria required to dispense the items 110a-c. Thus, some of the item data 136 is used to fulfill the dispensing criteria. However other item data 136 may simply be used to indicate pricing and inventory.

In some embodiments, the dispensing criteria of the item data 136 may include, without limitation, a purchase limit for the items, a permission requirement from the owner of the items, and an expiration date for the items. For example, the dispensing criteria might allow a consumer 134 to only obtain one item per week. This limitation can be useful when there is a shortage of the items 110a, such as medical masks during a virus pandemic.

Another dispensing criteria dependent on the item data 136 could also be based on price. In essence, the monetary account of the consumer 134 has insufficient funds to purchase the selected items 110a-c. At that point the vending machine controller 118 would not be triggered to dispensed items 110a-c because the dispensing criteria is not achieved.

Figure 16:
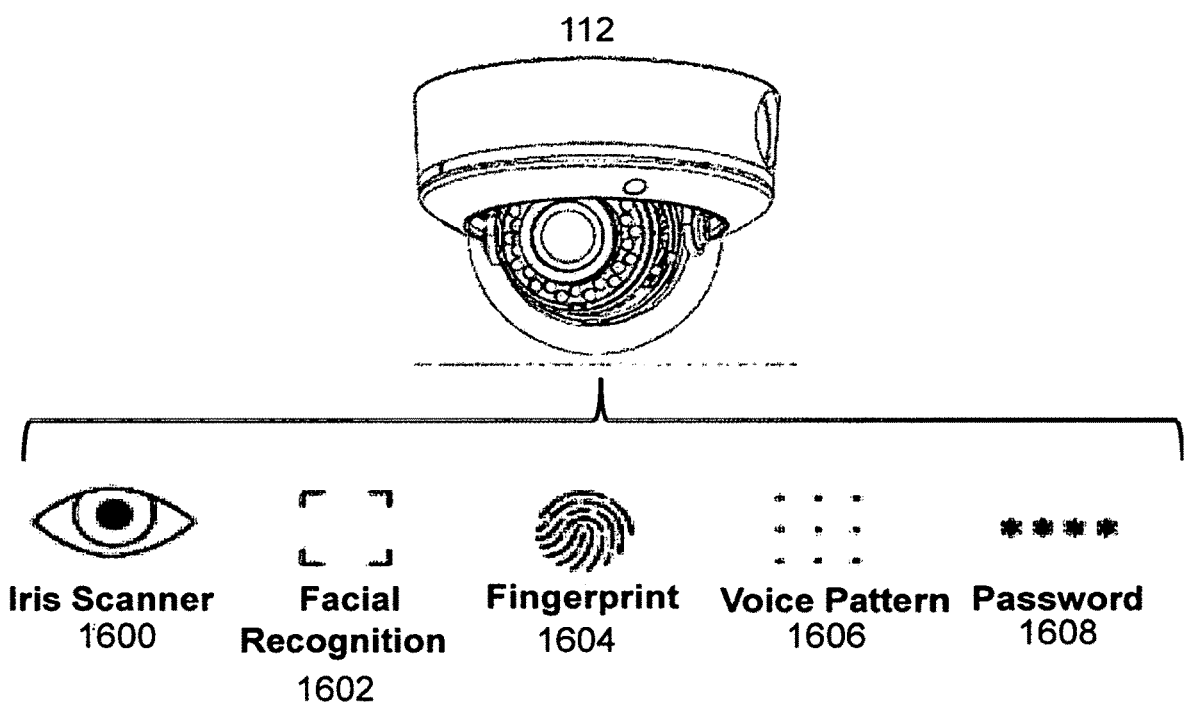
FIG. 16 is an exemplary biometric reader, and variations thereof as operative on the vending machine.

Looking now at FIG. 16, a biometric reader 112 is one of the means the vending system 100 utilizes to verify the consumer 134, and thereby achieve the dispensing criteria. The biometric reader 112 may include a security identification and authentication device that uses automated methods of verifying and recognising the identity of a living person based on a physiological or behavioral characteristic. The physiological characteristic that can be recorded by the biometric reader 112 may include, without limitation, fingerprints, facial images, iris, and voice recognition.

In some embodiments, the biometric reader 112 includes one or more of the following: an iris scanner 1600, a facial recognition scanner 1602, fingerprint scanner 1604, a voice recognition software 1606, a password decoder 1608, and a bodily fluid tester. The physiological characteristic of the consumer 134 will correspond to the readings collected by the biometric reader 112, and involve the collection and recognition of a fingerprint, a facial feature, an iris, a voice pattern, and a bodily fluid.

For example, an iris scanner on the front panel of the housing 102 scans the iris of the consumer 134. The iris pattern serves as consumer data 138 that is transmitted to a remote data storage unit 128 and compared other iris patterns stored therein. If there is a match, consumer 134 who received the iris scanning is linked with the consumer data 138 in the remote data storage unit 128. Consequently, any payments, permissions, and special needs can be accommodated based on the consumer data 138.

However in other embodiments, the biometric reader 112 can collect any physiological or behavioral data from the consumer 134, convert the physiological or behavioral data to stored consumer data 138, and then compare that data to stored consumer data 138 to verify identity of the consumer 134. Thus, a physiological characteristic of the consumer 134 that matches the consumer data 138 can satisfy one or more of the dispensing criteria for the vending machine controller 118 to release the items 110a-c.

Similar to the biometric reader 112, the vending system 100 may also utilize a camera 114 to record an image or video of the consumer 134. The camera 114, or a secondary camera 114 may also be utilized to capture an image or video of the items 110a-c being dispensed. The camera 114 may be operatively coupled to the housing 102, so as to record activity at or near the housing 102, storage bins 104a-n, and dispenser 122.

In one exemplary embodiment, if the camera image or video of the consumer 134 matches the consumer data 138 in the remote data storage unit 128, a dispensing criteria is met. In this example, a facial image of the consumer 134 is processed by facial recognition software, and then linked with a consumer 134 monetary account (consumer data 138) having sufficient funds to purchase the selected items 110a-c; or having sufficient owner or administrative permissions to enable access to the items 110a-c.

Furthermore, when the items 110a-c are dispensed, the camera 114 records an image or video of the dispensing. This creates indisputable evidence that the vending transaction occurred, which is an effective tool to protect against fraud. The camera, in this instance, is configured to fight against fraud and forgetfulness.

As discussed above, the vending system 100 utilizes a contactless dispenser 122 to dispense the items 110a-c to the consumer 134, Such a dispenser 122 is operable without requiring the consumer 134 to substantially touch any portion of the vending system 100 while obtaining the items 110a-c. In one possible embodiment, The dispenser 122 is operatively connected to the storage bins 104a-n. In some embodiments, a chute, or open space, allows the items 110a-c to travel from the storage bins 104a-n to the dispenser 122.

The dispenser 122 is also operatively connected to the vending machine controller 118. Thus, when the vending machine controller 118 triggers release of the item, the item is discharged through the dispenser 122, where the consumer 134 can obtain the item with substantially no contact. This contactless dispensing may require the dispenser 122 to have an automated gate that slides or swings between an open position and a closed position. Thus, the consumer 134 does not have to touch the gate or a flap in order to access the item. The dispenser 122 may also have an extendable serving plate that extends out to the consumer 134 while carrying the selected items 110a-c. The extendable serving plate would be automated, so that the consumer 134 is not required to touch any portion of the housing 102 to obtain the item.

The vending system 100 is also unique in that the dispensed items 110a-c are video recorded. This can be beneficial for purchase verification, purchase history records, and inventory updates. For this purpose, the vending system 100 utilizes an item scanner 124 in proximity to the storage bins 104a-n and/or the dispenser 122. The item scanner 124 is operatively connected to the vending machine memory 120 and the dispenser 122, so that the scanning function converts and transfers to item data 136.

In one non-limiting embodiment, the item scanner 124 is an electronic device that scans an item code label 126 affixed to the item packaging. In this manner, the item scanner 124 identifies the items 110a-c while being dispensed. The scanned items 110a-c generate at least a portion of the item data 136. For example, when a medical masks is dispensed, the item scanner 124 identifies that one medical mask has been sold. The vending machine memory 120 processes that the storage bins 104a-n are empty of medical masks. Consequently, a message is sent to an inventory center, or a remote data storage unit 128, indicating that replacement medical masks are necessary at the soonest possible time.

As discussed above, in order to store the consumer data 138 and the item data 136, a remote data storage unit 128 is utilized. The remote data storage unit 128 may be remotely located from the housing 102. Thus, the remote data storage unit 128 is often in a different building, a different region, or possibly even in outer space operating in or near a satellite. However the remote data storage unit 128, in some cases, may simply be attached to the housing 102.

In any case, the remote data storage unit 128 is operatively connected to the vending machine memory 120 and/or the processor 116, so as to communicate back and forth therewith by transmitting and receiving consumer data 138 and item data 136. In some embodiments, the remote data storage unit 128 may include, without limitation, a cloud server, a computer server, a database, and a call center. However any processing device that can store data, and is configurable to communicate with the vending machine memory 120 and/or processor 116 may be utilized for this purpose.

In some embodiments, the consumer 134 and item data 136 may be formed as radio signals, data packets, satellite signals, light signals, and other data transmission means known in the art. A transmitter 130 may be operatively connected to the vending machine memory 120. The transmitter 130 is configured to transmit the item data 136 and the consumer data 138.

In one non-limiting embodiment, the transmitter 130 is an electronic device that transmits radio waves. Thus, an antenna may also be utilized for transmitting signals to the remote data storage unit 128. However other technologies for transmitting data may also be used. Additionally, a receiver 132 in the housing 102 is operable to receive the item data 136 and the consumer data 138. The receiver 132 may be electronic device that receives audio, video, or radio signals from the remote data storage unit 128. However other technologies for receiving data may also be used.

In one possible embodiment, the remote data storage unit 128 is configured to enable storage of consumer data 138 related to the consumer 134. The consumer 134 initially populates the consumer data 138 into the remote data storage unit 128 during a registration stage, prior to the vending transaction. The consumer data 138 is stored, and subsequently used by the vending system 100 to verify the consumer 134, and dispensing criteria associated with the consumer 134.

In other embodiments, the consumer 134 may utilize a mobile communication device 106 that is in communication with the remote data storage unit 128 to access and modify consumer data 138. The consumer data 138 can include monetary account data of the consumer, biometric data of the consumer, an image of the consumer, a name, contact information, a password, and any special permissions for the consumer in relation to specific items. The dispensing criteria can use some or all of the consumer data 138 for selective dispensing of items 110a-c.

For example, the dispensing criteria associated with the consumer data 138 may be that if the consumer 134 is a medical professional, any amount of medical gloves and medical masks can be dispensed for no charge. Thus, the consumer data 138 forms at least part of the dispensing criteria. In another example, a consumer 134 who is recognized through biometric readings may be flagged as an authorized to purchase more than six medical masks per week. The biometric readings do not match any consumer criteria for qualified medical professionals that can obtain more than six medical masks per week.

As illustrated in FIG. 17, the vending system 100 may include a mobile communication device 106, such as a smart phone, laptop, or a tablet. The mobile communication device 106, as taught here, is generally a personal smartphone carried by the consumer 134 and used to scan biometric data directly from the consumer 134, enter/edit consumer data 138, and perform vending transactions through communications with the vending machine controller 118.

In operation, the consumer 134 possesses the mobile communication device 106. The consumer 134 uses the mobile communication device 106 to communicate with the remote data storage unit 128, so as to input and edit consumer data 138. The mobile communication device 106 also communicates with the vending machine controller 118 and the vending machine memory 120 to transact vending operations. This can include buying the items.

The mobile communication device 106 utilizes various communication means known in the art for such communications. The communication means may include, without limitation, Wi-Fi transmissions, radio frequencies, satellite technologies, near field communications (NFC), and Quick Response code scanning capabilities. The consumer 134 can use a personal mobile communication device 106 for various other remote functions, as described below.

Similar to the housing 102 of the vending system 100, the mobile communication device 106 comprises at least one mobile biometric reader 1700 that is configured to recognize at least one physiological characteristic of the consumer 134. As above, the mobile biometric reader 1700 can include a variety of readers, including, a facial recognition scanner, a fingerprint scanner, an iris scanner, a voice recognition software, a password, and a bodily fluid tester.

The physiological characteristic of the consumer 134 correspond to the mobile biometric reader 112, which collects biometric readings directly from the consumer 134. This collection can be through: the collection and recognition of a fingerprint, a facial feature, an iris, a voice pattern, and a bodily fluid. As with the biometric reader 112 integrated into the housing 102 of the vending machine, the physiological characteristic of the consumer 134 collected by the mobile biometric reader 112 1700 is used to link the consumer 134 with the consumer data 138 stored in the remote data storage unit 128.

For example, FIG. 14 illustrates a facial recognition scanner 108 type of mobile biometric reader 112; and FIG. 17 illustrates the mobile biometric reader 112 as a fingerprint scanner 1700 in the form of a software application downloaded on a smartphone.

In yet other embodiments, the mobile communication device 106 is operable to remotely view and select the items 110a-c in the storage bins 104a-n. In this operation, the consumer 134 selects and purchases the items 110a-c directly through the mobile communication device 106, which allows for no contact with the housing 102 or dispenser 122. The name of the item, the price of the item, and an image of the item may be displayed to provide sufficient information for the consumer 134 to make an appropriate purchase. (See FIG. 18).

In this configuration, the mobile communication device 106 displays the items 110a-c through a search subsystems 1800. The search subsystem 1800 helps the consumer 134 view and select the items 110a-c in the storage bins 104a-n. The search subsystem 1800 may include, without limitation, a menu subsystem, a search subsystem, and a voice ordering subsystem.

Figure 18:
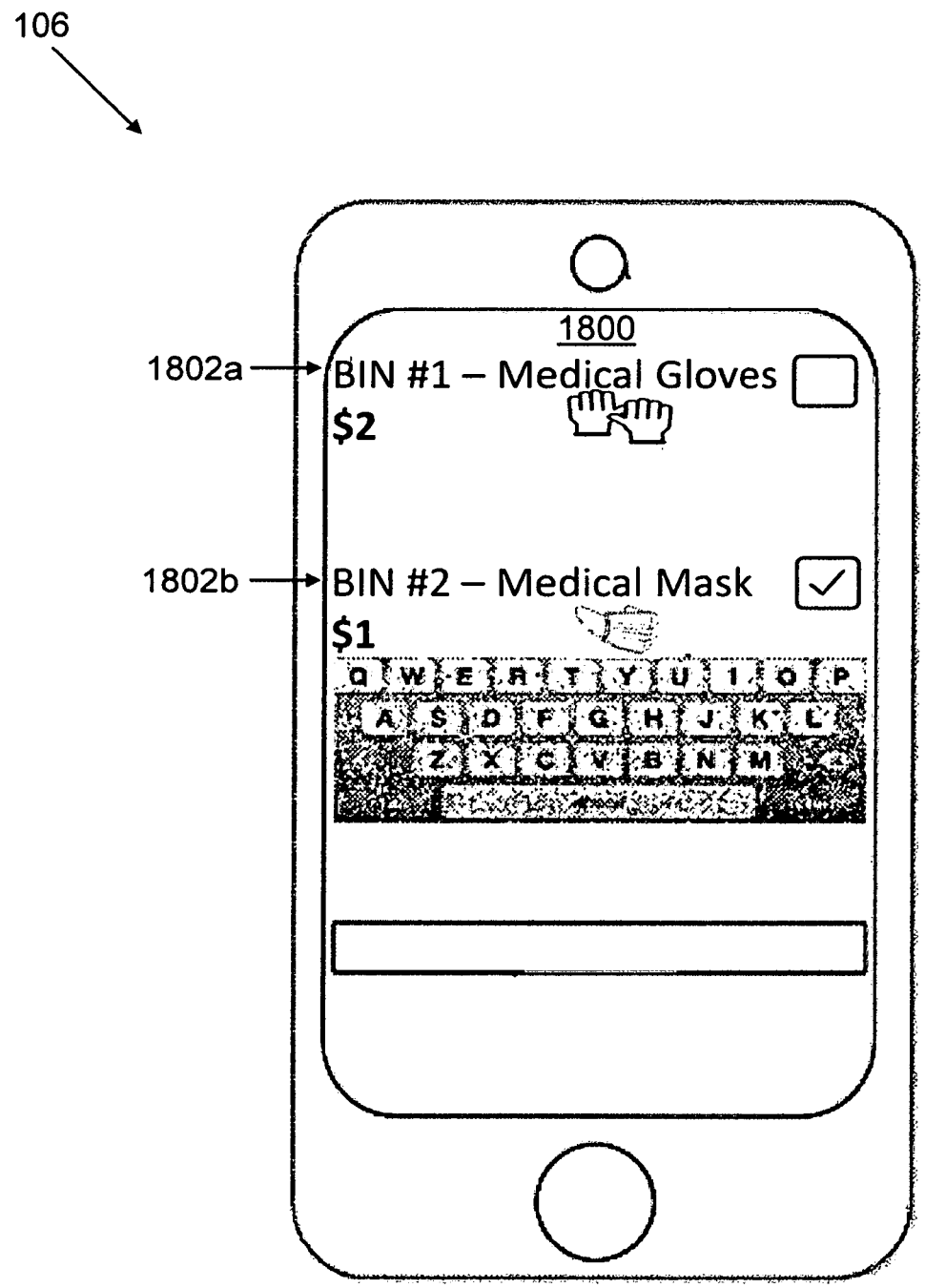
FIG. 18 is a mobile communication device displaying a search subsystem for selecting and transacting items from the vending system.

For example, as illustrated in FIG. 18, the consumer 134 select from between a first option 1802a of medical gloves in Bin #1, or a second option 1802b of medical masks in Bin #2 by placing a check mark next to the desired item. A keyboard appears to allow the consumer 134 to select the desired items 110a-c. Various alphanumeric digits and symbols, i.e., check marks, may be entered accordingly.

After the consumer 134 selects the items 110a-c, the mobile communication device 106 communicates with the remote data storage unit 128, either directly, or through the vending machine memory 120, transmitter 130, and receiver 132, to determine if the dispensing criteria have been achieved. This comparison may utilize logic data, matching software, and pattern recognition software that analyzes the stored consumer data 138 with the recorded physiological characteristic to achieve the predetermined dispensing criteria.

If the dispensing criteria is achieved, the mobile communication device 106 generates a purchase code label depicting the purchase order for the items 110a-c. The consumer 134 may then scan the purchase code label with the item scanner 124 near the dispenser 122. Once scanned, the item scanner 124 communicates to the vending machine controller 118, and the selected item is released for dispensing. The dispenser 122 automatically, and in a minimally obstructive manner, dispenses the selected mask 110a from Bin #2.

In some embodiments, the mobile communication device 106 interfaces with the vending machine controller 118, so as to charge e-wallets, such as Apple Pay®, and Google Wallet®. In other embodiments, the remote data storage unit 128 communicates with the monetary account of the consumer 134, deducting the amount for the selected items 110a-c. Nonetheless, other contactless forms of payment may also be used to consummate the vending transaction.

In yet other embodiments, the mobile communication device 106 is operable to enable populating the remote data storage unit 128 with the consumer data 138. This is accomplished during a registration stage when the consumer 134 inputs consumer data, such as name, contact information, biometric data, and monetary account data. A keyboard appears to allow the consumer 134 to input the consumer data 138 and link up with the remote data storage unit 128. Various alphanumeric digits and symbols may be entered accordingly.

Figure 19:
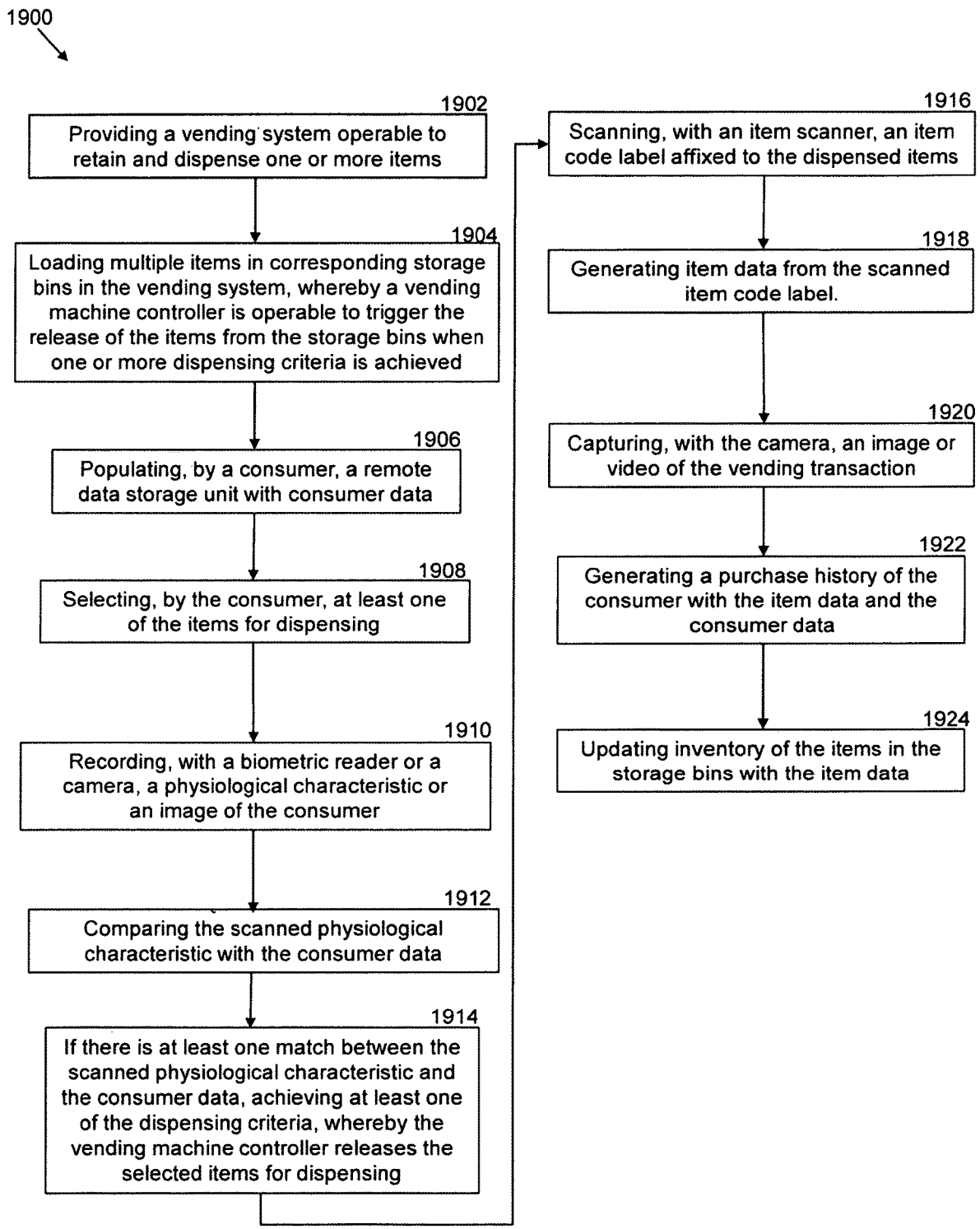
FIG. 19 is a simple flowchart for an exemplary method for contactless vending transactions.

FIG. 19 references a simple flowchart for an exemplary method 1900 for contactless vending transactions. The method 1900 is operable with a vending system that comprises a housing, multiple storage bins, a processor, a data storage device, a vending machine controller, a biometric reader, a camera, a transmitter, a receiver, a dispenser, and an item scanner.

The storage bins retain one or more items in a visible arrangement, so that the consumer can make an appropriate selection. The biometric reader and/or the camera help identify the consumer based on the consumer data stored in the remote data storage unit. The transmitter and receivers enables communication with the remote data storage unit. The vending machine controller works with the processor to accept payment and trigger release of the items through the dispenser when one or more dispensing criteria is achieved.

The vending machine controller is remotely monitored through a network. The item scanner scans an item code label that is affixed to the items as the items are dispensed. In this manner, the item scanner identifies the items and helps generate item data. The dispenser dispenses the purchased items in a contactless manner, which can include automated gates, and extendable serving plates that minimize contact between consumer and dispenser. In both the selection and collection process, the consumer and the vending system maintain a contactless relationship.

An initial Step 1902 comprises providing a vending system operable to retain and dispense one or more items.

The method 1900 may further comprise a Step 1904 of loading multiple items in corresponding storage bins in the vending system, whereby a vending machine controller is operable to trigger the release of the items from the storage bins when one or more dispensing criteria is achieved. A Step 1906 includes populating, by a consumer, a remote data storage unit with consumer data. The input information can be typed into a keyboard for the mobile communication device.

Another Step 1908 comprises, selecting, by the consumer, at least one of the items for dispensing. A search subsystem displays in the mobile communication device, so as to In some embodiments, a Step 1910 comprises recording, with a biometric reader or a camera, a physiological characteristic or an image of the consumer. The consumer can be adjacent to the biometric reader and A Step 1912 includes comparing the scanned physiological characteristic with the consumer data.

A Step 1914 includes, if there is at least one match between the scanned physiological characteristic and the consumer data, achieving at least one of the dispensing criteria, whereby the vending machine controller releases the selected items for dispensing. The vending system 100 utilizes the biometric reader and/or the camera to identify the consumer, matching a physiological characteristic or an image/video of the consumer with the consumer data stored in the remote data storage unit. If there is a match, part of the dispensing criteria has been met, and the vending machine controller may dispense the selected items from the dispenser.

In some embodiments, a Step 1916 may include scanning, with an item scanner, an item code label affixed to the dispensed items. A Step 1918 comprises generating item data from the scanned item code label. The method 1900 may further comprise a Step 1920 of capturing, with the camera, an image or video of the vending transaction. A Step 1922 includes generating a purchase history of the consumer with the item data and the consumer data. A final Step 1924 includes updating inventory of the items in the storage bins with the item data. The item data is especially effective for such transactions.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

The preceding description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A vending machine system operating with at least one vending machine and a server farm, the vending machine comprising:
    a housing;
    a plurality of storage bins disposed within the housing, each of said storage bins storing one or more food items of a particular type;
    a contactless item dispenser disposed within the housing, the contactless item dispenser adapted to retrieve purchased items from the plurality of storage bins and dispense them using an extendable serving plate;
    a processor disposed within the housing, the processor coupled to the contactless item dispenser;
    a network interface coupled to the processor, the network interface adapted to communicate with the server farm;
    wherein the network interface is adapted to receive at least one order for a specific item;
    wherein, in response to the order, the processor is adapted to cause the contactless item dispenser to dispense the item using the extendable serving plate;
    wherein, in response to the item being dispensed, the network interface is adapted to communicate the purchase to the server farm;
    wherein the server farm is adapted to maintain a list of particular user accounts and wherein the server farm associates the purchase with a particular user account to form a purchase history for the particular user account;
    wherein the server farm is adapted to assemble a diet report card for the particular user based on the purchase history; and
    wherein the server farm is adapted to make the diet report card available to a second particular user account.

2. The vending machine system of claim 1 further comprising a first mobile device, the first mobile device adapted to communicate with the server farm, the first mobile device being associated with the particular user account and wherein the first mobile device is adapted to send the at least one order to the server farm.

3. The vending machine system of claim 2 wherein the vending machine further includes a code reader coupled to the processor and wherein the first mobile device is adapted to display an order code to the code reader and wherein the processor, in response to the display of the order code to the code reader, causes the contactless item dispenser to dispense the item using the extendable serving plate.

4. The vending machine system of claim 2 further comprising a second mobile device, the second mobile device adapted to communicate with the server farm, the mobile device being associated with the second particular account, and wherein the server farm communicates the diet report card to the second mobile device.

5. The vending machine system of 4 wherein the server farm maintains a wallet associated with the particular user and wherein funds are added to the wallet based on the diet report card.

* * * * *